(12) United States Patent
Murakami et al.

(10) Patent No.: US 8,223,878 B2
(45) Date of Patent: Jul. 17, 2012

(54) TRANSMITTER APPARATUS, RECEIVER APPARATUS, AND WIRELESS COMMUNICATION METHOD

(75) Inventors: Yutaka Murakami, Kanagawa (JP); Kiyotaka Kobayashi, Tokyo (JP); Masayuki Orihashi, Kanagawa (JP); Toshiyuki Morii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 12/689,923

(22) Filed: Jan. 19, 2010

(65) Prior Publication Data

US 2010/0118987 A1    May 13, 2010

Related U.S. Application Data

(63) Continuation of application No. 10/589,080, filed on Aug. 30, 2006, now Pat. No. 7,684,506.

(30) Foreign Application Priority Data

Feb. 13, 2004  (JP) ................................. 2004-037088
Dec. 14, 2004  (JP) ................................. 2004-361105

(51) Int. Cl.
  *H04B 7/02*     (2006.01)
(52) U.S. Cl. ........................................ 375/267; 375/299
(58) Field of Classification Search .................. 375/267, 375/299, 347–349
  See application file for complete search history.

(56) References Cited

U.S. PATENT DOCUMENTS

| | | | |
|---|---|---|---|
| 6,127,971 A | 10/2000 | Calderbank | |
| 6,356,605 B1 | 3/2002 | Hosur | |
| 6,724,828 B1 | 4/2004 | Dabak | |
| 7,139,324 B1 | 11/2006 | Ylitalo | |
| RE40,056 E * | 2/2008 | Heath, Jr. et al. | 375/267 |
| 2001/0005406 A1 | 6/2001 | Mege | |
| 2002/0060996 A1* | 5/2002 | Kwak et al. | 370/335 |
| 2002/0122383 A1* | 9/2002 | Wu et al. | 370/210 |
| 2003/0035490 A1 | 2/2003 | Gollamudi | |
| 2003/0072258 A1 | 4/2003 | Tarokh | |
| 2003/0228850 A1 | 12/2003 | Hwang | |
| 2004/0116077 A1 | 6/2004 | Lee | |
| 2005/0157683 A1* | 7/2005 | Ylitalo et al. | 370/334 |
| 2006/0023666 A1* | 2/2006 | Jalali et al. | 370/334 |
| 2006/0141951 A1* | 6/2006 | Wallace et al. | 455/101 |
| 2006/0193268 A1* | 8/2006 | Walton et al. | 370/264 |
| 2006/0251149 A1 | 11/2006 | Fujii | |

FOREIGN PATENT DOCUMENTS

JP      02179145      7/1990
(Continued)

OTHER PUBLICATIONS

Supplementary European Search Report dated May 17, 2011.
(Continued)

*Primary Examiner* — Emmanuel Bayard
(74) *Attorney, Agent, or Firm* — Dickinson Wright PLLC

(57) ABSTRACT

When space-time block code signals are to be transmitted, the patterns thereof are changed in accordance with data to be transmitted. This advantageously allows a good-quality data transmission to be achieved by the space-time block code signals. In addition, since data can be transmitted by use of the patterns of the space-time block code signals, the data transmission efficiency can be improved.

6 Claims, 24 Drawing Sheets

FOREIGN PATENT DOCUMENTS

| | | |
|---|---|---|
| JP | 9-500245 | 1/1997 |
| JP | 2001148678 | 5/2001 |
| JP | 2004502376 | 1/2004 |
| JP | 20040007729 | 1/2004 |
| WO | 95/01018 | 1/1995 |
| WO | 0201732 | 1/2002 |
| WO | 02/33841 | 4/2002 |
| WO | 02/51031 | 6/2002 |

OTHER PUBLICATIONS

PCT International Search Report dated May 24, 2005.

V. Tarokh, et al.; "Space-Time Block Codes from Orthogonal Designs," IEEE Transactions on information theory, vol. 45, No. 5, Jul. 1999, pp. 1456-1467.

H. Jafarkhani; "A Quasi-Orthogonal Space-Time Block Code," IEEE Transactions on communications, vol. 49, No. 1, Jan. 2001, pp. 1-4.

* cited by examiner

FIG.6A WHEN DATA 101C REPRESENTS "0"
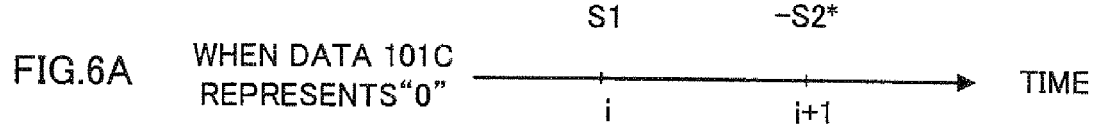
FIG.6B WHEN DATA 101C REPRESENTS "1"
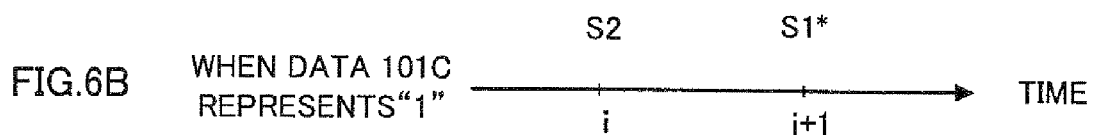
FIG.7A WHEN DATA 101C REPRESENTS "0"
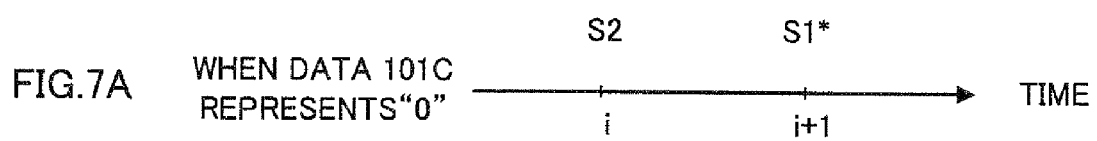
FIG.7B WHEN DATA 101C REPRESENTS "1"
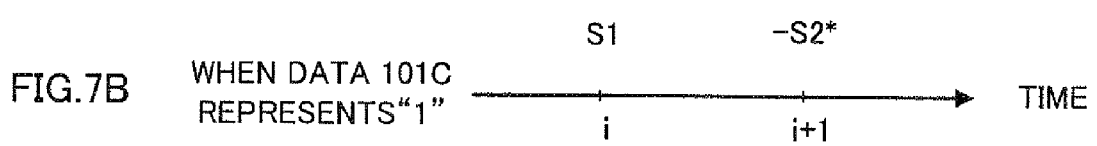

FIG.8A  WHEN DATA 101C REPRESENTS "0"
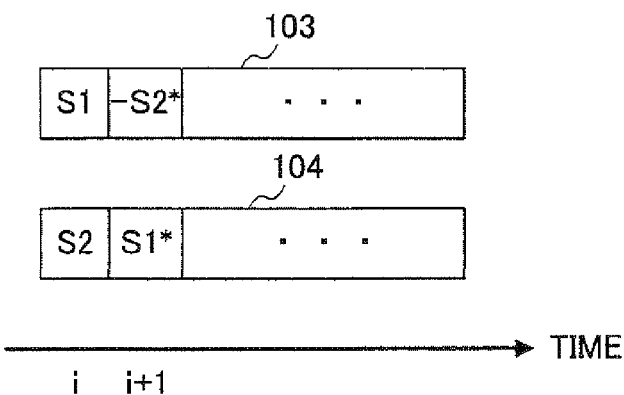
FIG.8B  WHEN DATA 101C REPRESENTS "1"
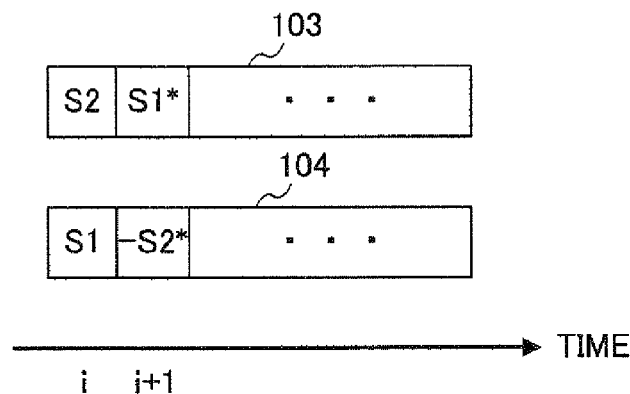

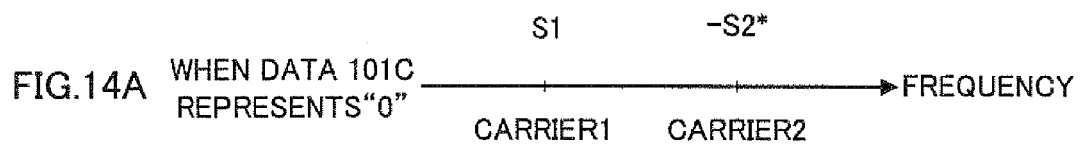
FIG.14A WHEN DATA 101C REPRESENTS "0"
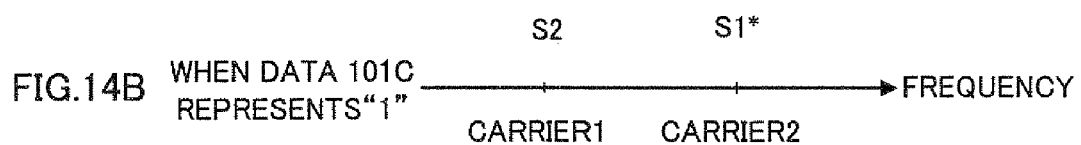
FIG.14B WHEN DATA 101C REPRESENTS "1"
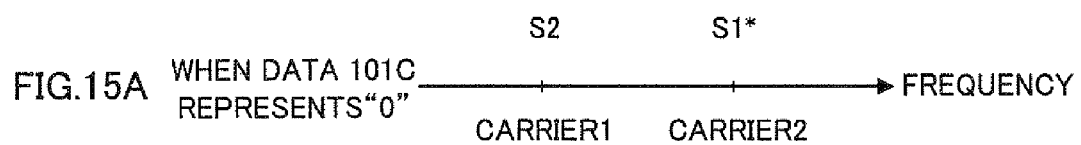
FIG.15A WHEN DATA 101C REPRESENTS "0"
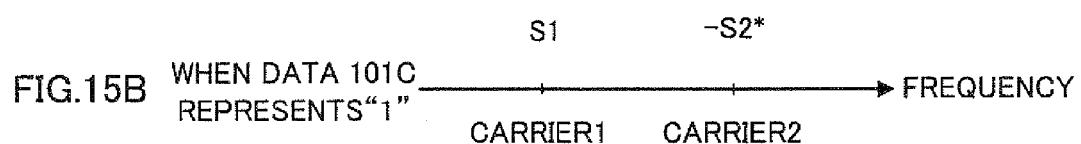
FIG.15B WHEN DATA 101C REPRESENTS "1"

FIG.16A WHEN DATA 101C REPRESENTS "0"
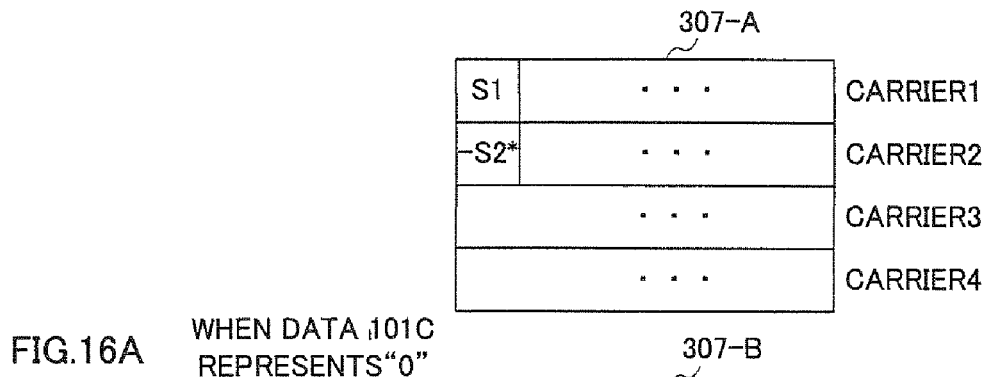
FIG.16B WHEN DATA 101C REPRESENTS "1"
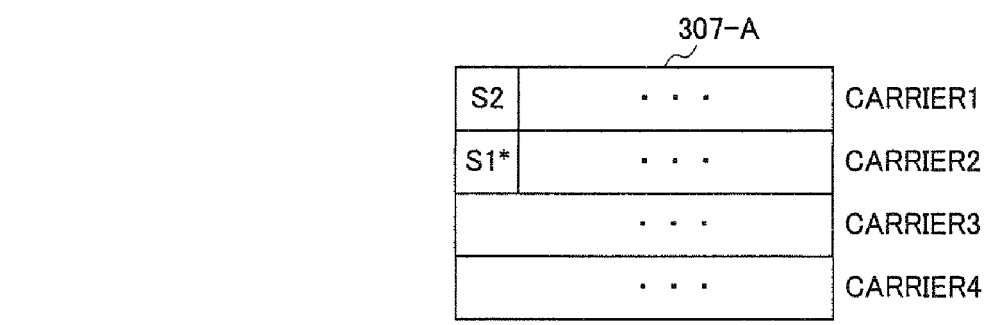

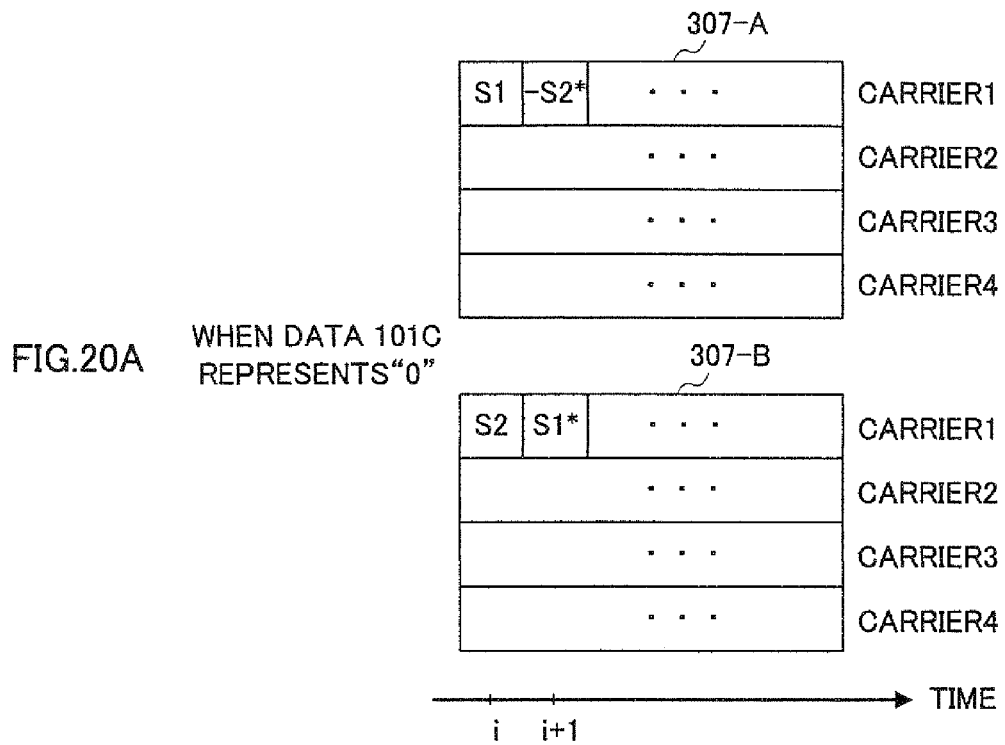
FIG.20A  WHEN DATA 101C REPRESENTS "0"
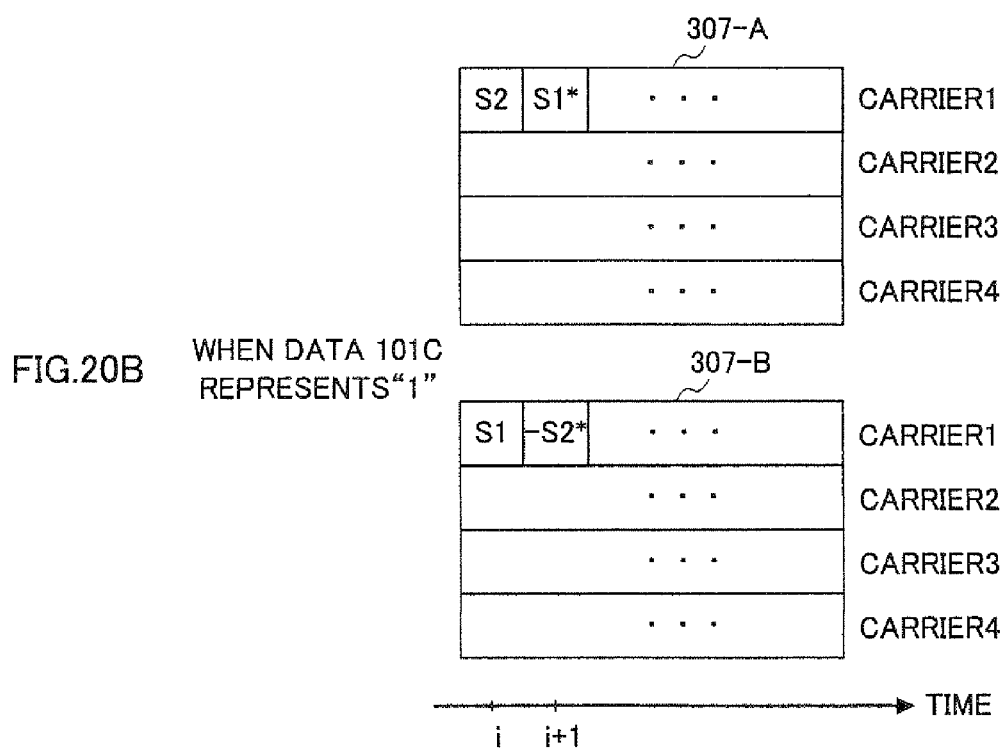
FIG.20B  WHEN DATA 101C REPRESENTS "1"

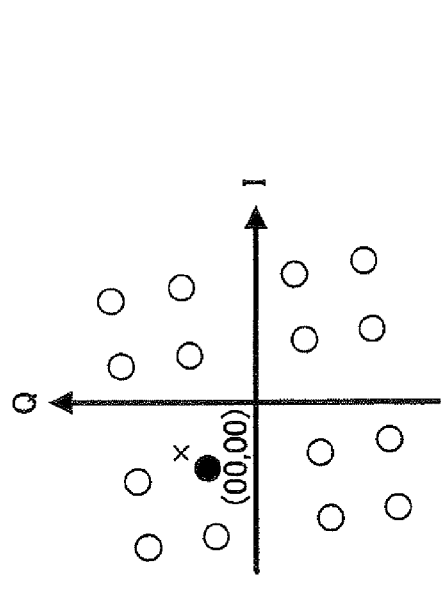
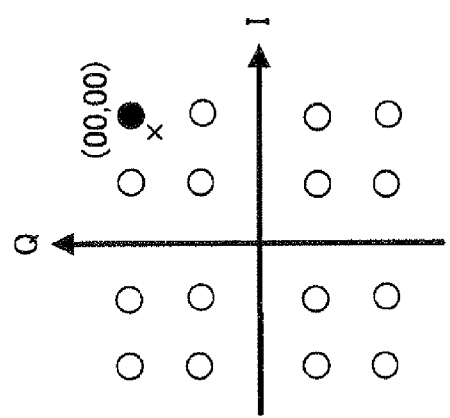
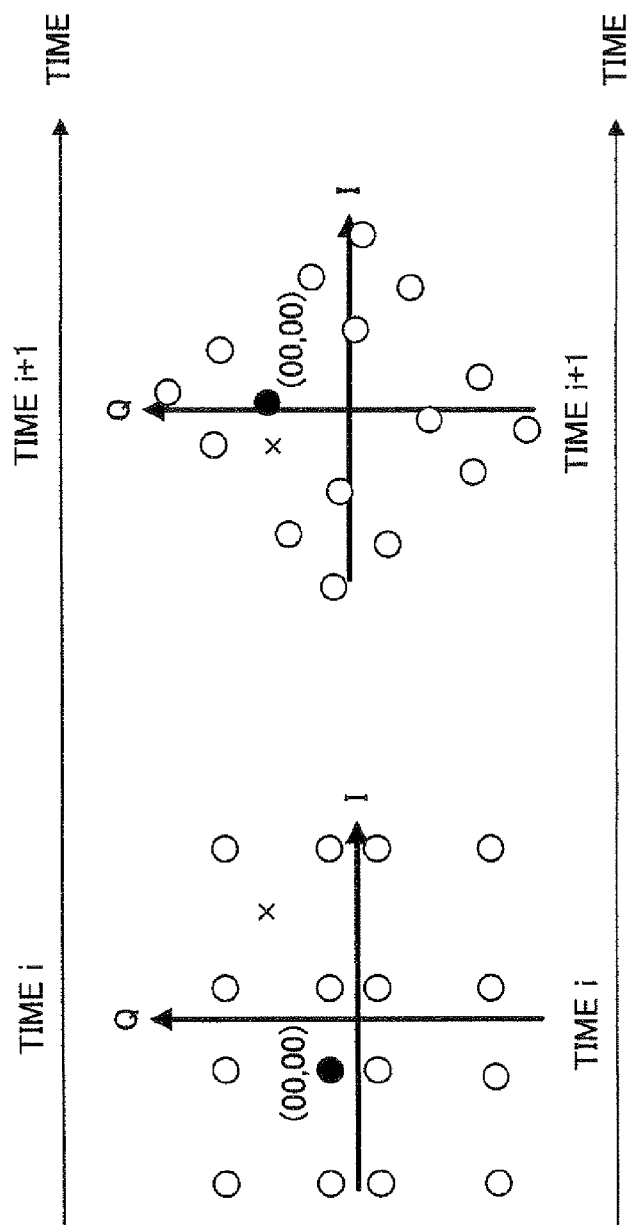
FIG.22A TRANSMISSION FOLLOWING EQUATION (1)
FIG.22B TRANSMISSION FOLLOWING EQUATION (2)

FIG.23A   WHEN DATA 101C REPRESENTS "0"
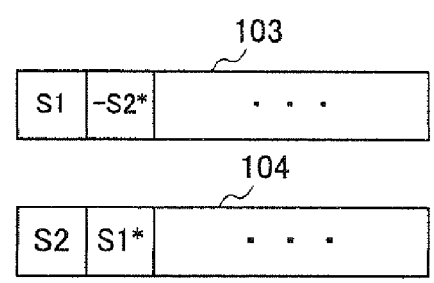
FIG.23B   WHEN DATA 101C REPRESENTS "1"
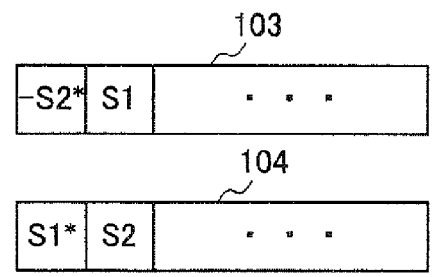

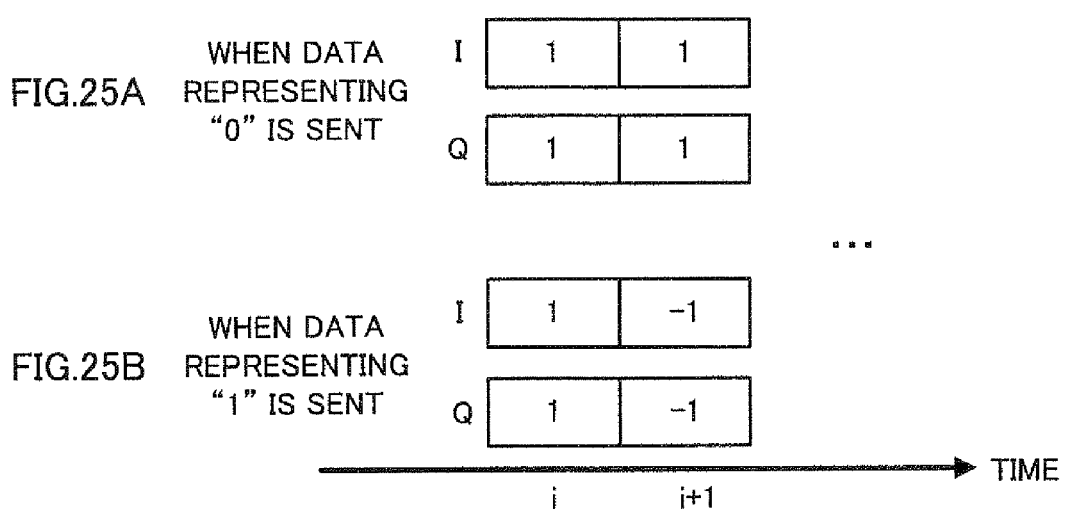

FIG.26A WHEN DATA REPRESENTING "00" IS SENT
I: 1, 3
Q: 3, 1
FIG.26B WHEN DATA REPRESENTING "01" IS SENT
I: −1, 3
Q: 3, −1
FIG.26C WHEN DATA REPRESENTING "10" IS SENT
I: 1, −1
Q: 3, 3
...
FIG.26D WHEN DATA REPRESENTING "11" IS SENT
I: 3, −3
Q: 1, 1
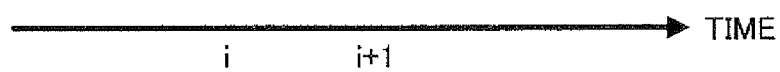
i    i+1    TIME

TRANSMITTER APPARATUS, RECEIVER APPARATUS, AND WIRELESS COMMUNICATION METHOD

This is a continuation of application Ser. No. 10/589,080 filed Aug. 11, 2006, which is a 371 application of PCT/JP2005/002016 filed Feb. 10, 2005, which is based on Japanese Application No. 2004-037088 filed Feb. 13, 2004 and Japanese Application No. 2004-361105 filed Dec. 14, 2004, the entire contents of each of which are incorporated by reference herein.

TECHNICAL FIELD

The present invention relates to a technique for improving frequency usage efficiency in wireless communication.

BACKGROUND ART

There are transmission methods for improving frequency usage efficiency known heretofore, including for example, methods for transmitting symbols of bock units using multiple antennas, such as with space-time block codes. This technique is disclosed, for example, in "Space-time Block Codes from Orthogonal Designs," IEEE Transactions on Information Theory, pp. 1456-1467, vol. 45, No. 5, July 1999. The content of this non-patent document 1 will be described below with reference to the accompanying drawings.

As shown in FIG. 1, a transmitting apparatus has multiple antennas AN1 and AN2 and transmits signals at antennas AN1 and AN2 simultaneously. A receiving apparatus receives the multiple signals, transmitted simultaneously, by means of antenna AN3.

FIG. 2 shows the frame configuration of the signals transmitted at antennas AN1 and AN2. Transmission signal A is transmitted at antenna AN1 and at the same time transmission signal B is transmitted at antenna AN2. Transmission signal A and transmission signal B consist of symbol blocks, where the same symbols are arranged in repetition so as to achieve coding gain and diversity gain.

This will be explained in further details. In FIG. 2, S1 and S2 represent different symbols and the asterisk ("*") represents the complex conjugate. In space-time block coding, at time i, symbol S1 is transmitted at first antenna AN1, and, at the same time, symbol S2 is transmitted at second antenna AN2. Subsequently, at time i+1, symbol −S2* is transmitted at first antenna AN1 and at the same time symbol S1* is transmitted at second antenna AN2.

At antenna AN3 at the receiving apparatus, the signal combining transmission signal A, which has been influenced by channel fluctuation h1(t) between antenna AN1 and antenna AN3, and transmission signal B, which has been influenced by channel fluctuation h2(t) between antenna AN2 and antenna AN3, is received.

The receiving apparatus estimates channel fluctuation h1(t) and h2(t), and, utilizing the estimated values, separates the received composite signal back to original transmission signal A and transmission signal B and thereafter decodes the individual symbols.

Thereupon, the use of space-time block coded signals such as shown in FIG. 2 makes possible maxim ratio combining of symbols S1 and S2 in spite of channel fluctuation h1(t) and h2(t), so that excellent coding gain and diversity gain are achieved. As a result, it is possible to improve reception quality.

Non-Patent Document 1: "Space-Time Block Codes from Orthogonal Designs," IEEE Transactions on Information Theory, pp. 1456-1467, vol. 45, No. 5. July 1999.

DISCLOSURE OF INVENTION

Problems to be Solved by the Invention

However, while the use of space-time block coded signals certainly improves reception quality, it also has a disadvantage of reducing the transmission rate. For example, S1* and −S2*, transmitted at time i+1, are demodulated in the receiving apparatus as S1 and S2, and are in effect the same information as S1 and S2 transmitted at time i. That is, the same information is transmitted twice and this much the data transmission rate decreases.

For example, in a general multi-antenna communications system, symbols S3 and S4 that are different from symbols S1 and S2 are transmitted at time i+1, so that, during the period of time i and time i+1, four symbols S1-S4 can be transmitted. To put it simply, the use of space-time block coding techniques reduces the data transmission rate to half that of general multi-antenna communication.

It is therefore an object of the present invention to further improve the data transmission rate in wireless communication.

Means for Solving the Problem

One aspect of the transmitting apparatus of the present invention employs a configuration having: a baseband signal former that changes an assignment of a modulated signal to a plurality of slots in accordance with transmission data and makes baseband signals in varying channel matrix patterns in accordance with transmission data; a radio section that converts the baseband signals to radio signals; and a transmit antenna that transmits the radio signals.

According to this configuration, channel matrix patterns are changed in accordance with transmission data, so that, in addition to the modulated symbols constituting the elements of the channel matrix, the patterns of the channel matrix can be used to transmit data. As a result, the amount of transmission data can be increased without widening the frequency band and frequency usage efficiency can be improved.

One aspect of the receiving apparatus of the present invention employs a configuration having: a channel matrix estimator that estimates a channel matrix using a plurality of slots of data; and a transmission data estimator that estimates transmission data based on a data assignment pattern to the channel matrix.

One aspect of the wireless communication method of the present invention includes the steps of: changing an assignment of a modulated signal to a plurality of slots in accordance with transmission data and making baseband signals in varying channel matrix patterns in accordance with transmission data, and transmitting the baseband signals; and estimating a channel matrix using a plurality of sots of data and estimating transmission data based on a data assignment pattern to the channel matrix.

Advantageous Effect of the Invention

According to the present invention, data is transmitted by channel matrix patterns, so that data transmission rate can be improved.

BRIEF DESCRIPTION OF DRAWINGS

FIG. 6A illustrates how signals are supplied to antenna AN1 when transmission data represents "0";

FIG. 6B illustrates how signals are supplied to antenna AN1 when transmission data represents "1";

FIG. 7A illustrates how signals are supplied to antenna AN2 when transmission data represents "0";

FIG. 7B illustrates how signals are supplied to antenna AN2 when transmission data represents "1";

FIG. 8A illustrates a space-time block code pattern when transmission data represents "0";

FIG. 8B illustrates a space-time block code pattern when transmission data represents "1";

FIG. 14A illustrates how signals are supplied to antenna AN1 when transmission data represents "0";

FIG. 14B illustrates how signals are supplied to antenna AN1 when transmission data represents "1";

FIG. 15A illustrates how signals are supplied to antenna AN2 when transmission data represents "0";

FIG. 15B illustrates how signals are supplied to antenna AN2 when transmission data represents "1";

FIG. 16A illustrates a space-time block code pattern when transmission data represents "0";

FIG. 16B illustrates a space-time block code pattern when transmission data represents "1";

FIG. 20A illustrates a space-time block code pattern where transmission data represents "0" and space-time block codes are arranged in the time domain;

FIG. 20B illustrates a space-time block code pattern where transmission data represents "1" and space-time block codes are arranged in the time domain;

FIG. 22A illustrates a signal point constellation pattern when transmission is done in the space-time block code pattern of equation (1);

FIG. 22B illustrates a signal point constellation pattern when transmission is done in the space-time block code pattern of equation (2);

FIG. 23A illustrates a space-time block code pattern when transmission data represents "0";

FIG. 23B illustrates a space-time block code pattern when transmission data represents "1";

FIG. 25A illustrates an M-ary orthogonal code assignment when data representing "0" is sent;

FIG. 25B illustrates an M-ary orthogonal code assignment when data representing "1" is sent;

FIG. 26A illustrates a channel matrix when data representing "00" is sent;

FIG. 26B illustrates a channel matrix when data representing "01" is sent;

FIG. 26C illustrates a channel matrix when data representing "10" is sent; and

FIG. 26D illustrates a channel matrix when data representing "11" is sent.

BEST MODE FOR CARRYING OUT THE INVENTION

Embodiments of the present invention will be described below in detail with reference to the accompanying drawings.

(Embodiment 1)

Figure 1:
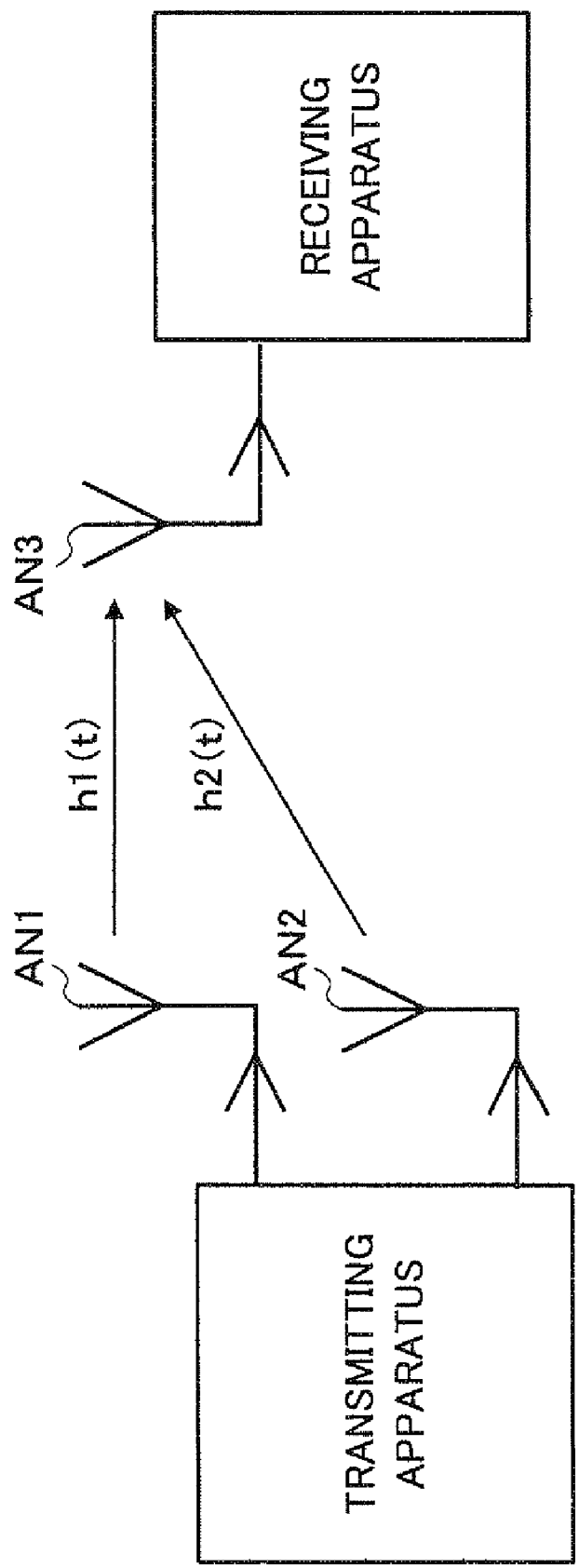
FIG. 1 is a block diagram showing a configuration of a conventional multi-antenna communication system.
Figure 2:
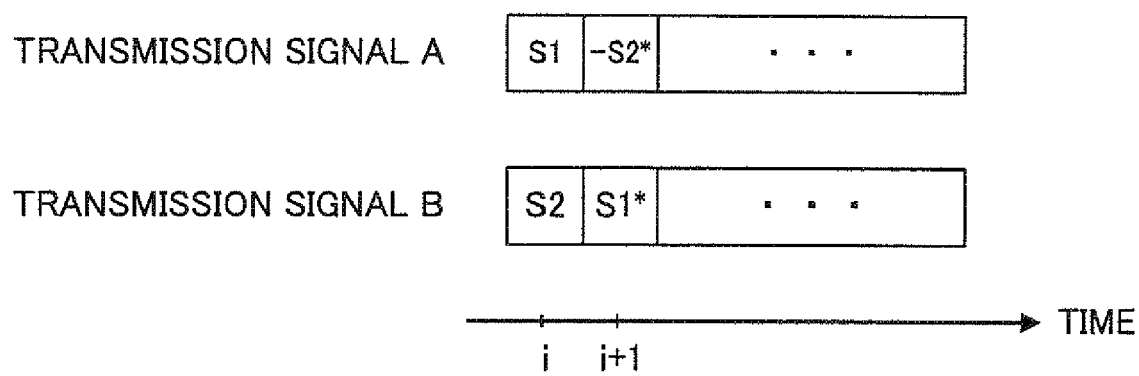
FIG. 2 illustrates space-time block codes.
Figure 3:
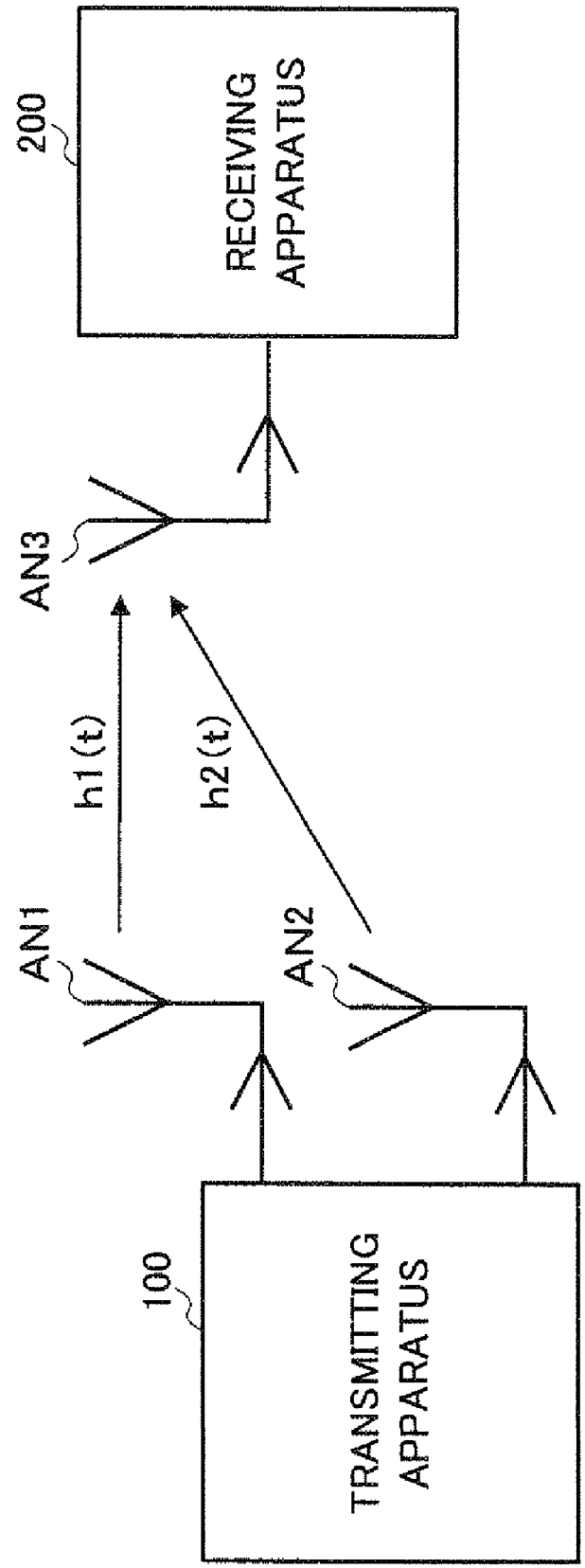
FIG. 3 is a block diagram showing a configuration of a multi-antenna communication system according to Embodiment 1.

FIG. 3 shows an overall configuration of multi-antenna communication system 10 of this embodiment. In multi-antenna communication system 10, transmitting apparatus 100 has multiple antennas AN1 and AN2 and transmits signals at antennas AN1 and AN2 simultaneously. Receiving apparatus 200 receives the multiple signals, transmitted simultaneously, in antenna AN3. The signal transmitted at antenna AN1 is influenced by channel fluctuation h1(t) and received in antenna AN3. The signal transmitted at antenna AN2 is influenced by channel fluctuation h2(t) and received in antenna AN3.

Figure 4:
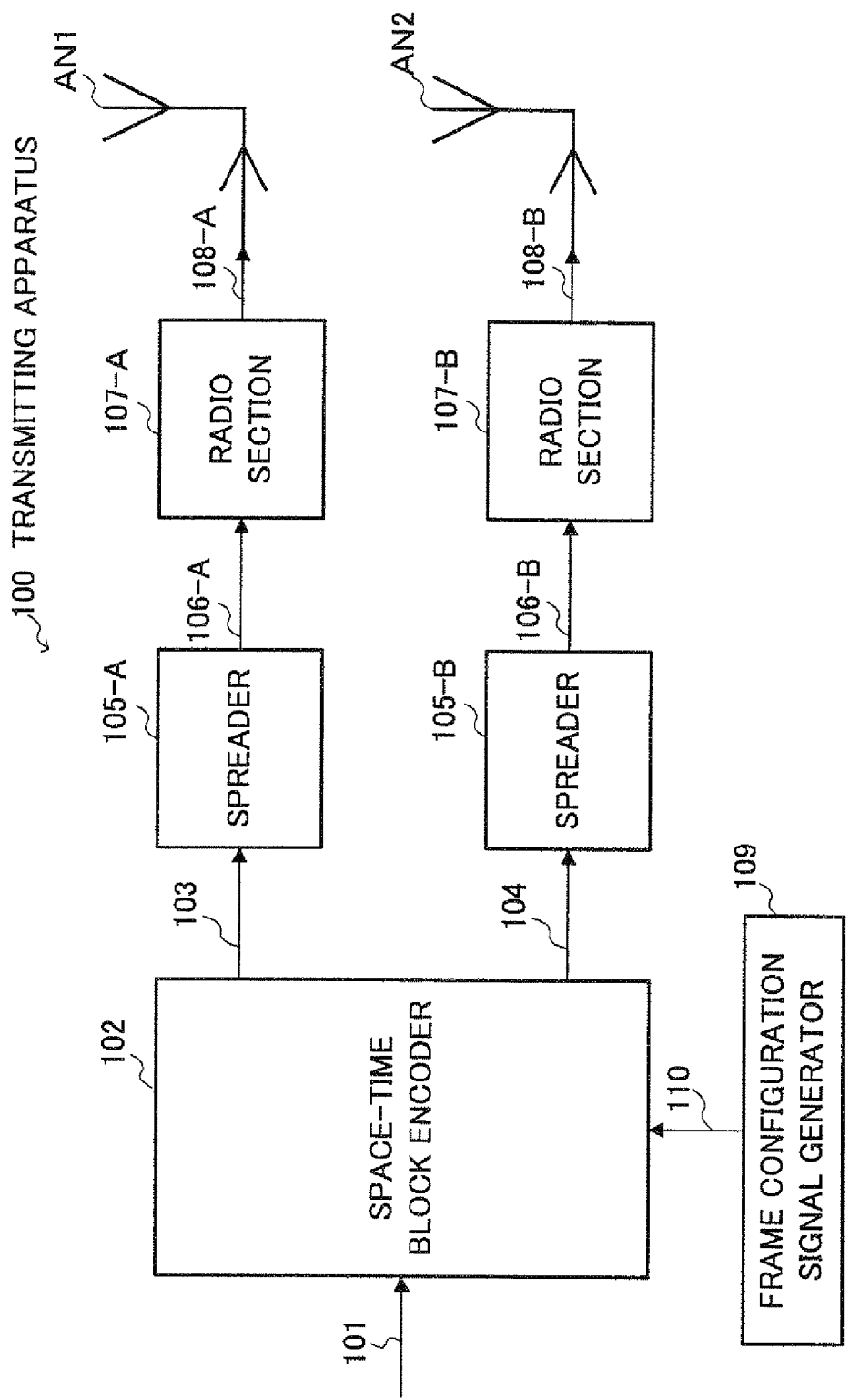
FIG. 4 is a block diagram showing a configuration of a transmitting apparatus according to Embodiment 1.

FIG. 4 illustrates the configuration of transmitting apparatus 100 of the present embodiment. Transmitting apparatus 100 inputs transmission digital signal (hereinafter simply "transmission data") in space-time block encoder 102. In accordance with frame configuration signal 110 generated in frame configuration signal generator 109, space-time block encoder 102 subjects transmission data 101 to space-time block coding processing and sends space-time block code signals 103 and 104 obtained, to spreaders 105-A and 105-B.

Spreaders 105-A and 105-B multiply spreading codes upon space-time block code signals 103 and 104 and obtain spread signals 106-A and 106-B, and send these signals to radio sections 107-A and 107-B. Radio sections 107-A and 107-B subject spread signals 106-A and 106-B to predetermined radio processing including quadrature modulation and frequency conversion, and supply radio transmission signals 108-A and 108-B obtained, to antennas AN1 and AN2.

Figure 5:
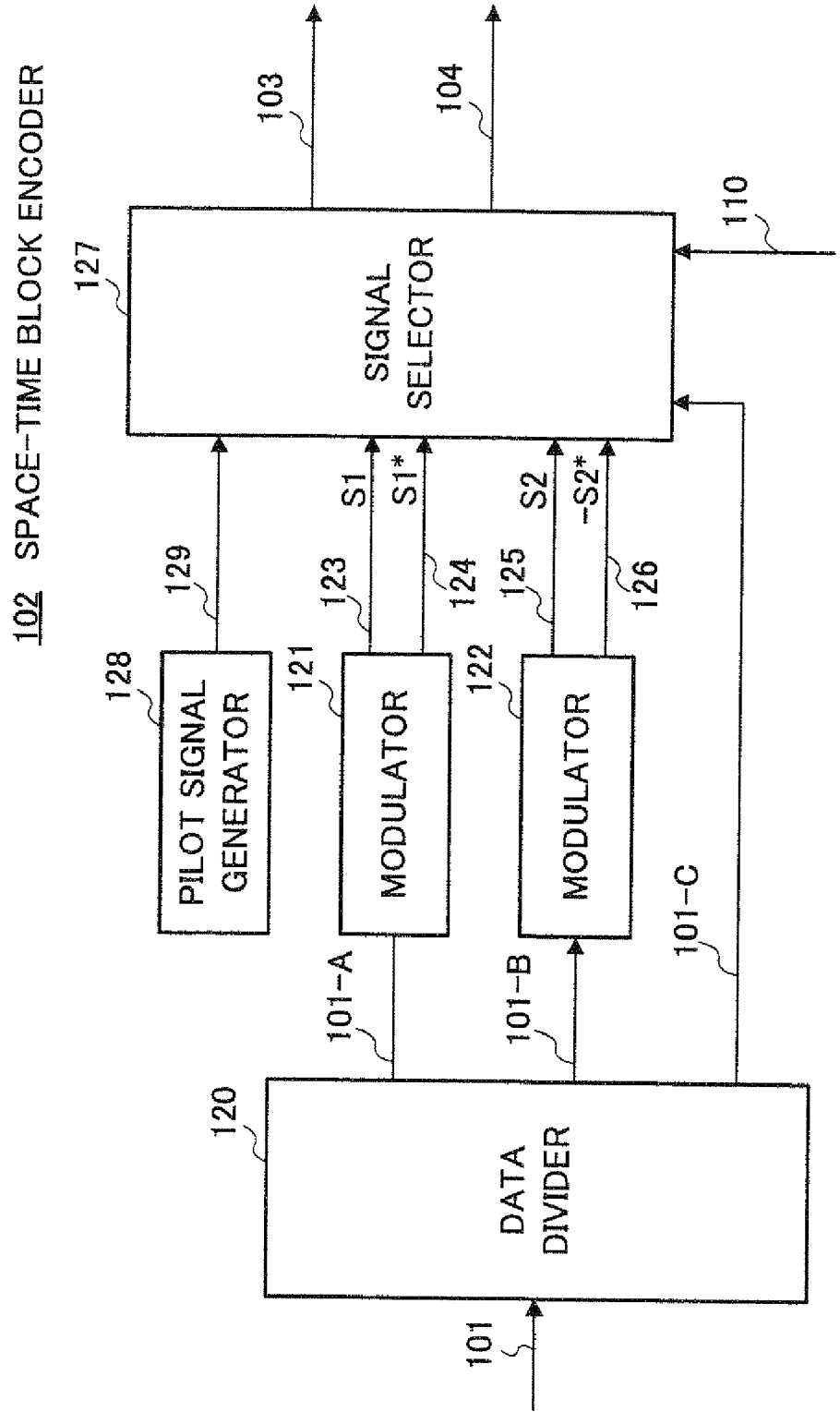
FIG. 5 is a block diagram showing a configuration of a space-time block encoder.

FIG. 5 illustrates a configuration of space-time block encoder 102. Space-time block encoder 102 first inputs transmission data 101 in data divider 120. Data divider 120 divides transmission data 101 into transmission data 101-A, 101-B and 101-C, and sends transmission data 101-A to modulator 121, transmission data 101-B to modulator 122, and transmission data 101-C to signal selector 127.

Modulator 121 subjects transmission data 101-A to digital modulation processing such as QPSK (Quadrature Phase Shift Keying) and 16QAM (Quadrature Amplitude Modulation) modulation, and thereby obtains transmission symbol S1. For example, in QPSK, one transmission symbol S1 is obtained from two-bit transmission data 101-A. Modulator 121 outputs transmission symbol S1 obtained as modulation signal 123, and outputs its complex conjugate S1* as modulation signal 124.

Likewise, modulator 122 subjects transmission data 101-B to digital modulation processing such as QPSK and 16QAM modulation and obtains transmission symbol S2. Modulator 122 outputs transmission symbol S2 obtained as modulation signal 125 and outputs its negative complex conjugate −S2* as modulation signal 126.

Signal selector 127 divides modulation signals 123 and 124 from modulator 121 and modulation signals 125 and 126 from modulator 122 in an order in accordance with transmission data 101-C from data divider 120, and outputs these signals, assigned as output signal 103 and output signal 104 in accordance with transmission data 101-C. By this means, space-time block code signals 103 and 104 are made in different patterns in accordance with transmission data 101-C. Signal selector 127 inserts pilot signal 129, generated in pilot signal generator 128, in a position in accordance with frame configuration signal 110.

The process in signal selector 127 will be described in detail with reference to FIGS. 6A and 6B, FIGS. 7A and 7B, FIGS. 8A and 8B, and FIG. 9. FIGS. 6A and 6B illustrate signal 103 and FIGS. 7A and 7B illustrate signal 104. As shown in FIG. 6A, when transmission data 101-C represents "0," signal selector 127 transmits the symbols in the order of S1 and then −S2* and thereby obtains signal 103. On the other hand, as shown in FIG. 6B, when transmission data 101-C represents "1," signal selector 127 outputs the symbols in the order of S2 and then S1* and thereby obtains signal 103.

In addition, as shown in FIG. 7A, when transmission data 101-C represents "0," signal selector 127 outputs the symbols in the order of S2 and then S1* and thereby obtains signal 104. On the other hand, as shown in FIG. 7B, when transmission data 101-C represents "1," signal selector 127 outputs the symbols in the order of S1 and then −S2* and thereby obtains signal 104.

FIGS. 8A and 8B combine FIGS. 6A and 6B and FIGS. 7A and 7B. In other words, when transmission data 101-C represents "0," signal selector 127 makes space-time block code signals 103 and 104 in the pattern shown in FIG. 8A. In contrast, when transmission data 101-C represents "1," signal selector 127 makes space-time block code signals 103 and 104 in the pattern shown in FIG. 8B.

Figure 9:
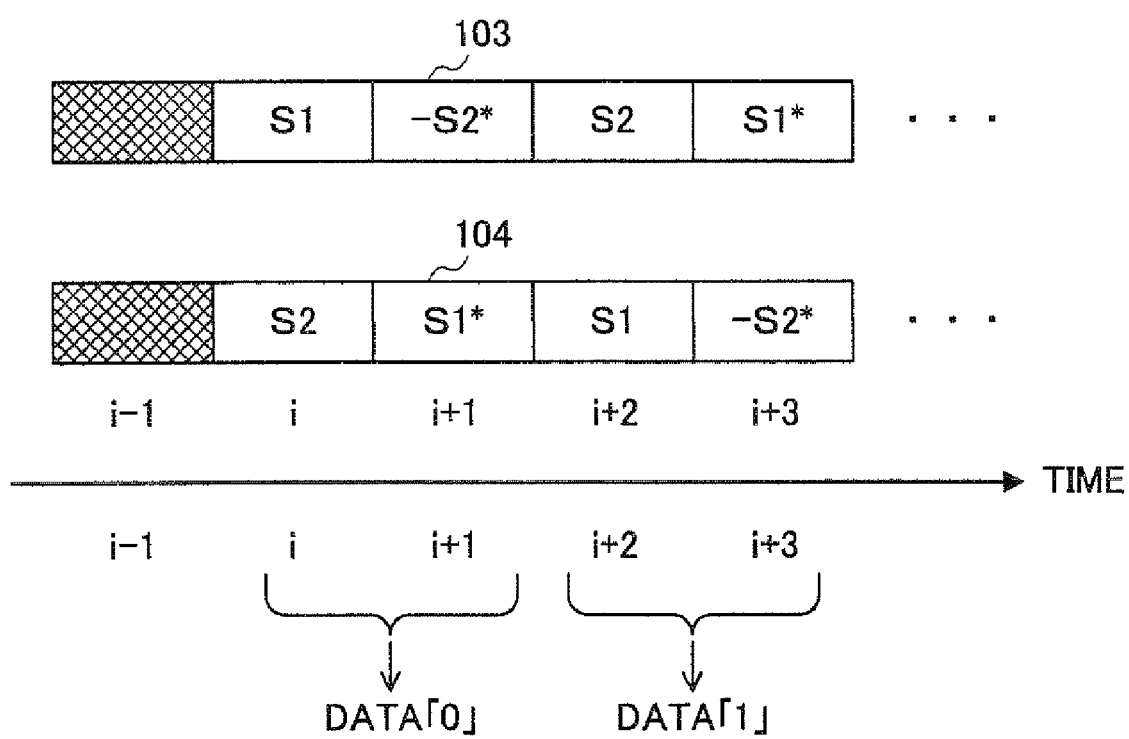
FIG. 9 illustrates an actual frame configuration pattern.

FIG. 9 illustrates an actual frame configuration pattern. The hatched portions in the figure represent the pilot symbols. At time i−1, modulated signals of the pilot symbols are transmitted at antennas AN1 and AN2. Following this, at time i and at time i+1, space-time block code signals 103 and 104 are transmitted in the pattern associated with data "0." Furthermore, at time i+2 and i+3, space-time block code signals 103 and 104 are transmitted in the pattern associated with data "1."

In this way, transmitting apparatus 100 transmits data in symbols S1 and S2 and transmits additional data by the pattern of the space-time blocks, so that it is possible to increase the amount of data that can be transmitted per unit time.

For example, a case will be contemplated here where modulators 121 and 122 perform QPSK modulation. Symbols S1 and S2 can transmit two bit data per symbol and so the amount of data that can be transmitted in symbols S1 and S2 during the period of time i and time i+1 is four bits. In addition to this, one more bit can be transmitted by the pattern of the space-time block codes in the period of time i and time i+1, so that total 5 bits can be transmitted.

Incidentally, when modulators 121 and 122 perform QPSK modulation, data divider 120 sends the first two bits of transmission data 101 to modulator 121, the next two bits to modulator 122, and one more bit to signal selector 127.

Figure 10:
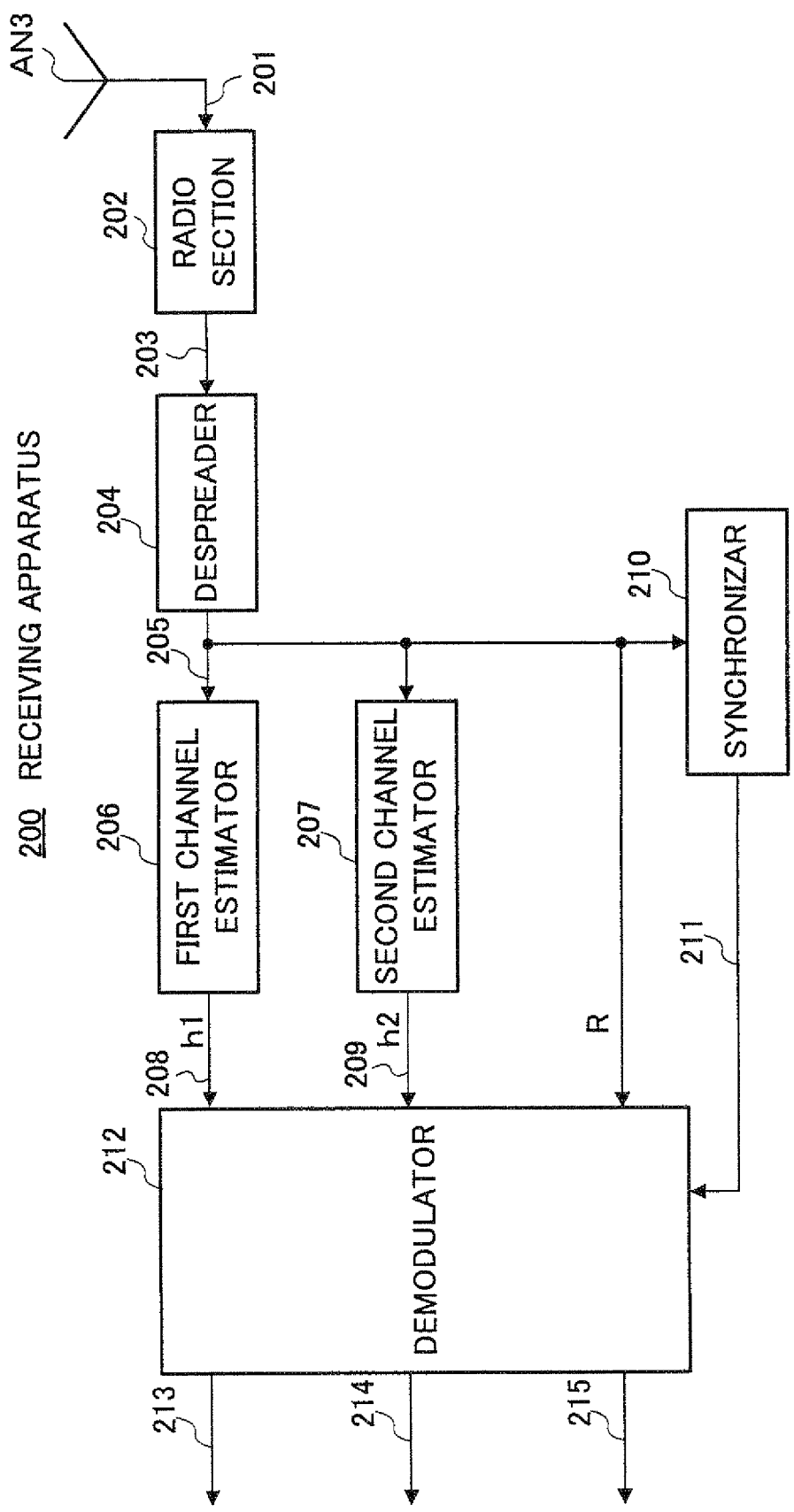
FIG. 10 is a block diagram showing a configuration of a receiving apparatus according to Embodiment 1.

FIG. 10 illustrates a configuration of receiving apparatus 200 that receives the space-time block code signals transmitted from transmitting apparatus 100. Receiving apparatus 200 inputs signal 201, received in antenna AN3, in radio section 202. Radio section 202 subjects signal 201 to predetermined radio reception processing including frequency conversion and quadrature demodulation, and sends baseband signal 203 obtained, to despreader 204. Despreader 204 despreads baseband signal 203 and sends despread baseband signal 205 to first channel estimator 206, second channel estimator 207, synchronizer 210, and demodulator 212.

First channel estimator 206 determines channel fluctuation h1 between antenna AN1 and antenna AN3 based on the pilot symbol in the signal transmitted at antenna AN1, and sends the result as channel estimation signal 208, to demodulator 212. Second channel estimator 207 determines channel fluctuation h2 between antenna AN2 and antenna AN3 based on the pilot symbol in the signal transmitted at antenna AN2, and sends the result as channel estimation signal 209, to demodulator 212.

Synchronizer 210 synchronizes the signals transmitted at antennas AN1 and AN2 using the pilot symbols in the signals transmitted at antennas AN1 and AN2 and sends timing signal 211 for synchronization to demodulator 212.

Figure 11:
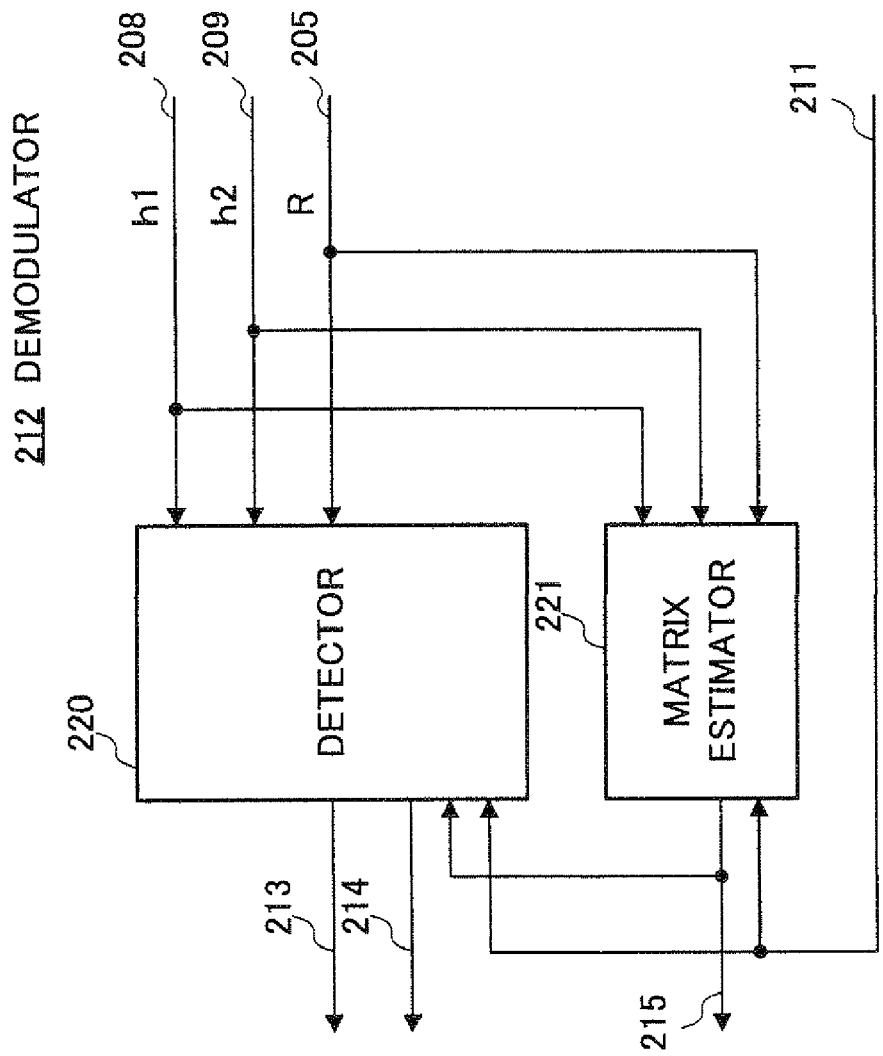
FIG. 11 is a block diagram showing a configuration of a demodulator.
Figure 12:
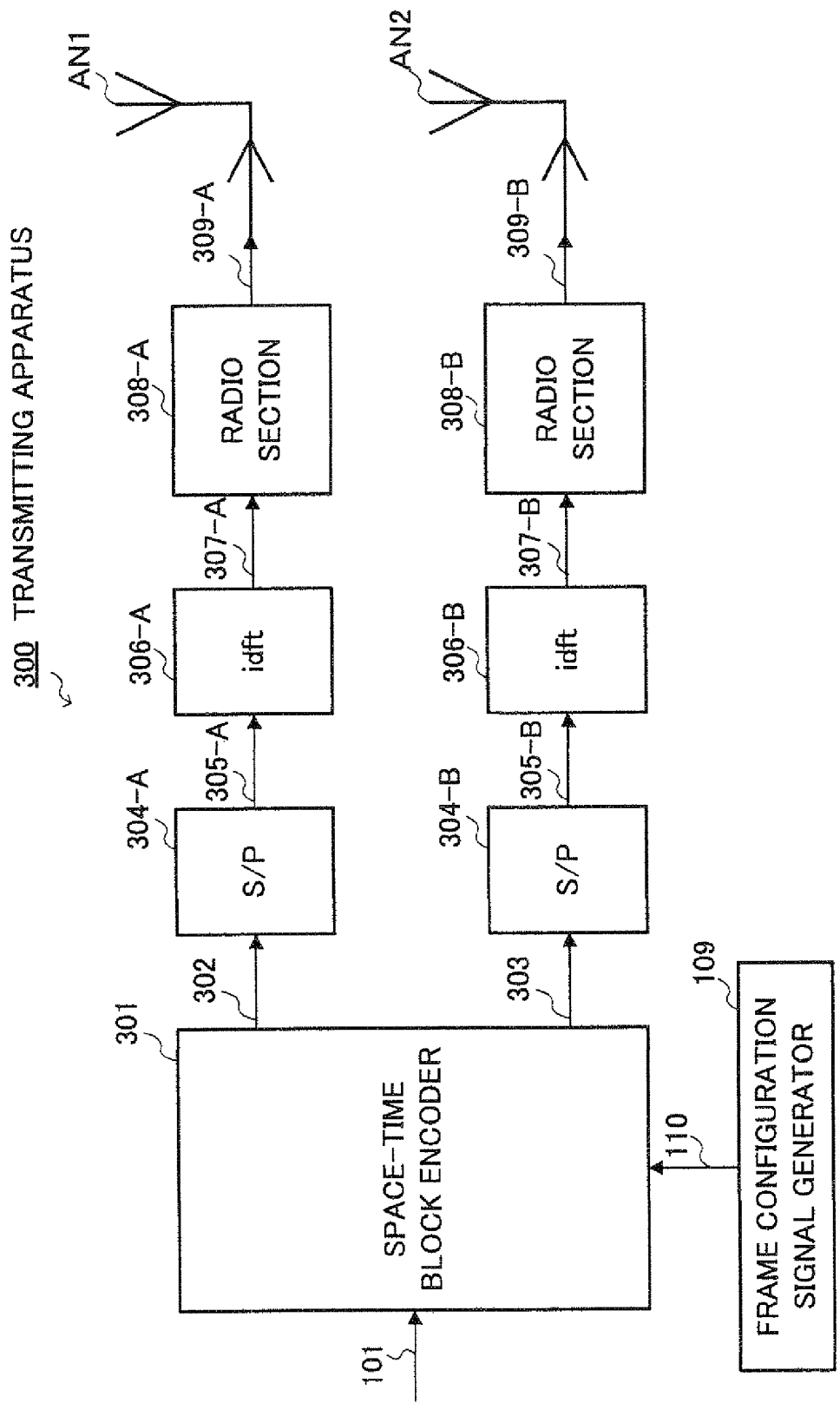
FIG. 12 is a block diagram showing a configuration of a transmitting apparatus according to Embodiment 2.

FIG. 11 illustrates a configuration of demodulator 212. Demodulator 212 has detector 220 and matrix estimator 221, into which channel estimation signals 208 and 209, baseband signal 205, and timing signal 211 are inputted. Matrix estimator 221 estimates the matrix pattern of the estimated channel matrix and thereby estimates as to in which pattern the space-time block codes are received.

This will be explained in further details. A signal transmitted at antenna AN1 and a signal transmitted at antenna AN2 are combined and received in antenna AN3. This composite received signal at time t is R(t). In addition, channel estimation values h1 and h2 at time t are h1(t) and h2(t). Given these, the following relationship equation is established when space-time block codes are transmitted in the pattern shown in FIG. 8A:

[Equation 1]

$$\begin{pmatrix} R(i) \\ R(i+1) \end{pmatrix} = \begin{pmatrix} h1(i) & h2(i) \\ h2*(i+1) & -h1*(i+1) \end{pmatrix} \begin{pmatrix} S1 \\ S2 \end{pmatrix} \quad (1)$$

By contrast with this, the following relationship equation is established when space-time block codes are transmitted in the pattern shown in FIG. 8B:

[Equation 2]

$$\begin{pmatrix} R(i) \\ R(i+1) \end{pmatrix} = \begin{pmatrix} h2(i) & h1(i) \\ -h1*(i+1) & h2*(i+1) \end{pmatrix} \begin{pmatrix} S1 \\ S2 \end{pmatrix} \quad (2)$$

Consequently, matrix estimator 221 estimates as to which one of equation (1) and equation (2) is established. In other words, channel estimator 221 estimates as to in which pattern transmitting apparatus 100 transmits the space-time block codes in the period of time i and time i+1. For example, a method is possible that estimates S1 and S2 utilizing equation (1) and equation (2) and then determines as to by which equation S1 and S2 are estimated to be more reliable symbols. Then, when matrix estimator 221 estimates that equation (1) is more reliable than equation (2), matrix estimator 221 outputs "0" as received data 215. On the other hand, when estimating that equation (2) is more reliable than equation (1), matrix estimator 221 outputs "1" as received data 215.

This received data 215 is transmitted to detector 220 as well. When "0" is inputted as received data 215, detector 220 uses equation (1) and estimates symbols S1 and S2 by calculating the inverse matrix of equation (1), thereafter demodulates symbols S1 and S2, and, by this means, obtains received data 213 corresponding to symbol S1 and received data 213 corresponding to symbol S2. On the other hand, when "1" is inputted as received data 215, detector 220 uses equation (2) and estimates symbols S1 and S2 by calculating the inverse matrix of equation (2), thereafter demodulates symbols S1 and S2, and, by this means, obtains received data 213 corresponding to symbol S1 and received data 213 corresponding to symbol S2.

By this means, receiving apparatus 200 is able to demodulate all of the transmission data consisting of the data transmitted in the space-time block codes and the data transmitted by the pattern of the space-time block codes.

Thus, when transmitting space-time block codes utilizing multiple antennas, the present embodiment changes the patterns of the space-time block codes according to transmission data. Consequently, the present embodiment has an advantage of transmitting data in excellent quality by virtue of the space-time block codes. Moreover, the present invention has an additional advantage of transmitting data by the pattern of the space-time block codes. The present embodiment thus implements transmitting apparatus 100 that improves the transmission rate.

In addition, the present embodiment features matrix estimator 221 and detector 220 separately. Matrix estimator 221 identifies the pattern of received space-time block codes and estimates the data transmitted by the pattern of the space time block codes. Detector 220 is provided as a signal separator and demodulator that separates and demodulates the individual modulation signals forming the space-time block codes utilizing the estimated channel matrix estimated by matrix estimator 221. Providing these elements, the present embodiment implements receiving apparatus 200 that restores all transmission data from space-time block code signals provided in varying patterns in accordance with transmission data.

Although a case has been described above with the present embodiment where a spread spectrum communication scheme is employed, the present invention is by no means limited to this and is equally implementable when a spread spectrum communication scheme is not employed.

(Embodiment 2)

This embodiment proposes applying OFDM modulation to space-time block code signals, the pattern of which is subject to change in accordance with transmission data, and transmitting OFDM-modulated signals.

FIG. 4 illustrates the configuration of the transmitting apparatus of the present embodiment, in which parts that are identical to those in FIG. 4 are assigned the same numerals as in FIG. 4 without further explanation. Transmitting apparatus 300 has virtually the same configuration as that of transmitting apparatus 100 in FIG. 4, except that space-time encoder 301 has a slightly different configuration and that transmitting apparatus 300 has S/P converters 304-A and 304-B, and inverse discrete Fourier transformers 306-A and 306-B.

Transmitting apparatus 300 sends space-time block code signals 302 and 303, made in space-time block encoder 301, to S/P converters 304-A and 304-B, respectively. Parallel signals 305-A and 305-B, obtained through S/P converters 304-A and 304-B, are subjected to the inverse discrete Fourier transform in inverse discrete Fourier transformers 306-A and 306-B and are made OFDM signals 307-A and 307-B. OFDM signals 307-A and 307-B are subjected to predetermined radio processing in radio sections 308-A and 308-B, made OFDM transmission signals 309-A and 309-B, and thereafter supplied to antennas AN1 and AN2.

Figure 13:
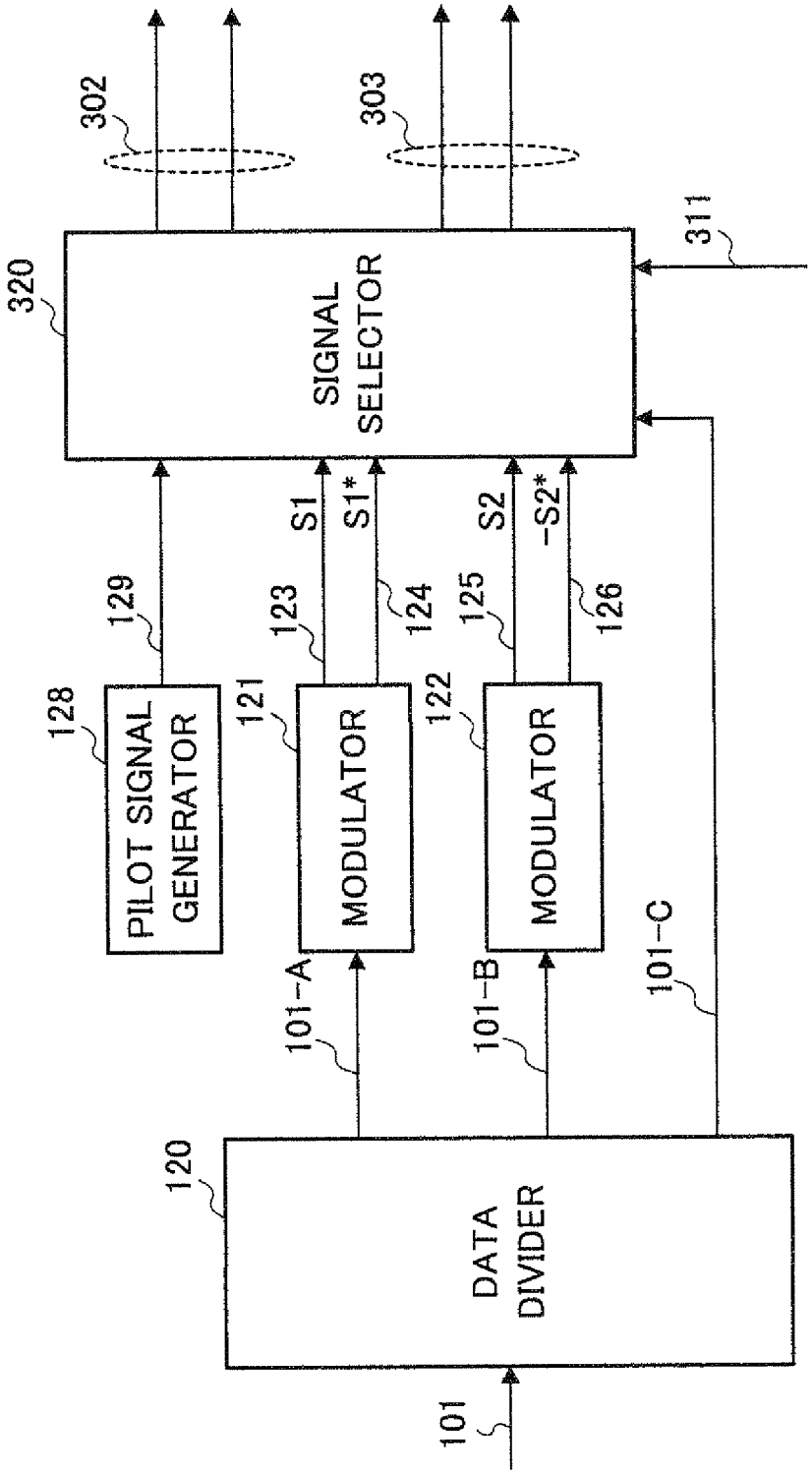
FIG. 13 is a block diagram showing a configuration of a space-time block encoder.

FIG. 13 illustrates the configuration of space-time block encoder 301. Parts in FIG. 13 that are identical to those in FIG. 5 are assigned the same numerals as in FIG. 5 without further explanation. Signal selector 320 changes the pattern of space-time block codes in accordance with transmission data 101-C. The selection process in signal selector 320 is virtually the same as that in signal selector 127 shown in FIG. 5, except that the present embodiment sends space-time block codes in an OFDM transmission scheme and implements slightly different selection patterns.

The process in signal selector 320 will be described in detail with reference to FIGS. 14A and 14B, FIGS. 15A and 15B, and FIGS. 16A and 16B, and FIG. 17. FIGS. 14A and 14B illustrate OFDM signal 307-A and FIGS. 15A and 15B illustrate OFDM signal 307-B. As shown in FIG. 14A, when transmission data 101-C represents "0," signal selector 320 outputs symbol S1 and symbol −S2* in signal 302. These symbols S1 and −S2* are subjected to OFDM modulation through S/P converter 304-A and inverse discrete Fourier transformer 306-A, and, by this means, symbol S1 and symbol −S2* are arranged in carrier 1 and in carrier 2, respectively, and transmitted at antenna AN1. On the other hand, as shown in FIG. 14B, when transmission data 101-C represents "1," signal selector 320 outputs symbol S2 and symbol S1* in signal 302. These symbols S2 and S1* are subjected to OFDM modulation through S/P converter 304-A and inverse discrete Fourier transformer 306-A, and, by this means, symbol S2 and symbol S1* are arranged in carrier 1 and in carrier 2, respectively, and transmitted at antenna AN1.

Furthermore, as shown in FIG. 15A, when transmission data 101-C represents "0," signal selector 320 outputs symbol S2 and symbol S1* in signal 303. These symbols S2 and S1* are subjected to OFDM modulation through S/P converter 304-A and inverse discrete Fourier transformer 306-A, and, by this means, symbol S2 and symbol S1* are arranged in carrier 1 and in carrier 2, respectively, and transmitted at antenna AN2. On the other hand, as shown in FIG. 15B, when transmission data 101-C represents "0," signal selector 320 outputs symbol S1 and symbol −S2* in signal 303. These symbols S1 and −S2* are subjected to OFDM modulation through S/P converter 304-B and inverse discrete Fourier transformer 306-B, and, by this means, symbol S1 and symbol −S2* are arranged in carrier 1 and in carrier 2, respectively, and transmitted at antenna AN2.

FIGS. 16A and 16B combine FIGS. 14A and 14B, and FIGS. 15A and 15B. When transmission data 101-C represents "0," OFDM signals 307-A and 307-B are outputted at antenna AN1 and AN2, respectively, in the symbol arrangement shown in FIG. 16A. That is, OFDM signal 307-A is transmitted at antenna AN1 and with this OFDM signal 307-B is transmitted at antenna AN2. On the other hand, when transmission data represents "1," OFDM signals 307-A and 307-B are transmitted at antennas AN1 and AN2, in the symbol arrangement shown in FIG. 16B.

Figure 17:
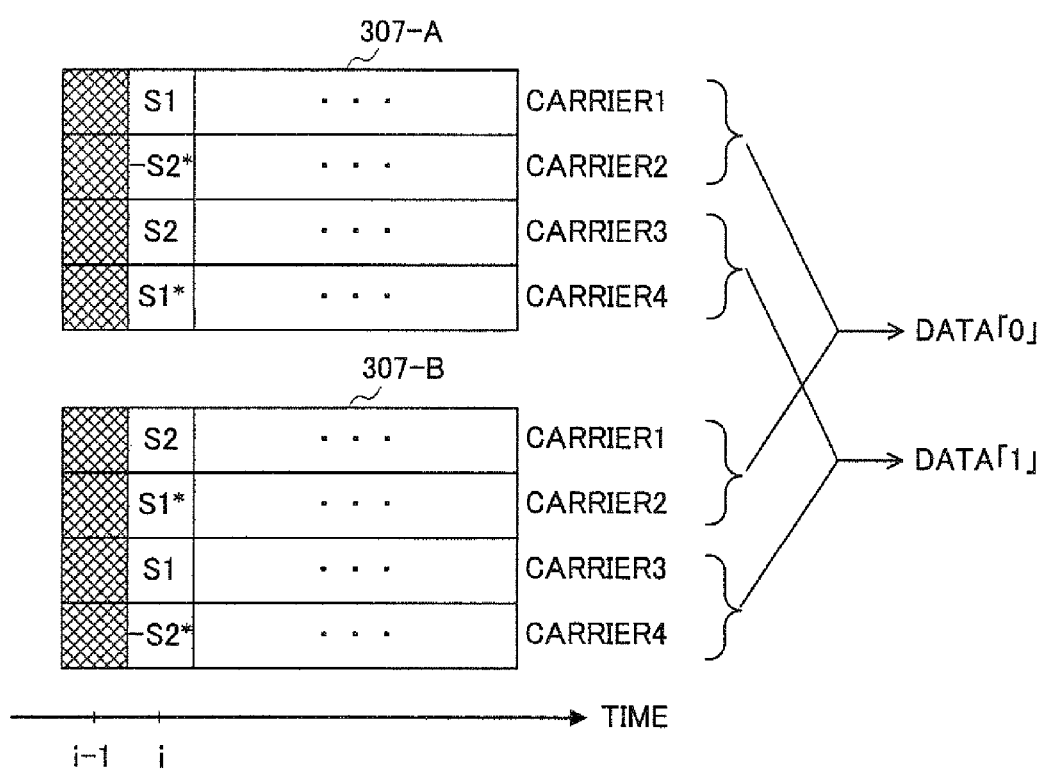
FIG. 17 illustrates an actual frame configuration pattern.

FIG. 17 shows an actual frame configuration pattern. The hatched portions in the figure represent the pilot symbols. At time i−1, modulated signals of the pilot symbols are transmitted at antennas AN1 and AN2. Subsequently, at time i, OFDM-modulated space-time block codes are transmitted at antennas AN1 and AN2. FIG. 17 illustrates a case where the space-time code blocks in a pattern associated with transmission data "0" are transmitted using carrier 1 and carrier 2 of two antennas AN1 and AN2, and where the space-time code blocks in a pattern associated with transmission data "1" are transmitted using carrier 3 and carrier 4.

Incidentally, in FIG. 17, for ease of understanding of the relationships represented in the figure, symbol S1 and symbol S2 assigned to carrier 3 and carrier 4 are shown with the same signs as symbol S1 and symbol S2 assigned to carrier 1 and carrier 2. However, symbols S1 and S2 assigned to carriers 1 and 2 and symbols S1 and S2 assigned to carriers 2 and 4 are different symbols obtained from different data.

In this way, transmitting apparatus 300 transmits data in symbols S1 and S2 of subcarrier 1 and subcarrier 2 and transmits additional data by the pattern of the space-time block codes. Likewise, transmitting apparatus 300 transmits data in the symbols of subcarrier 3 and subcarrier 4 and transmits additional data by the pattern of the space-time blocks.

Figure 18:
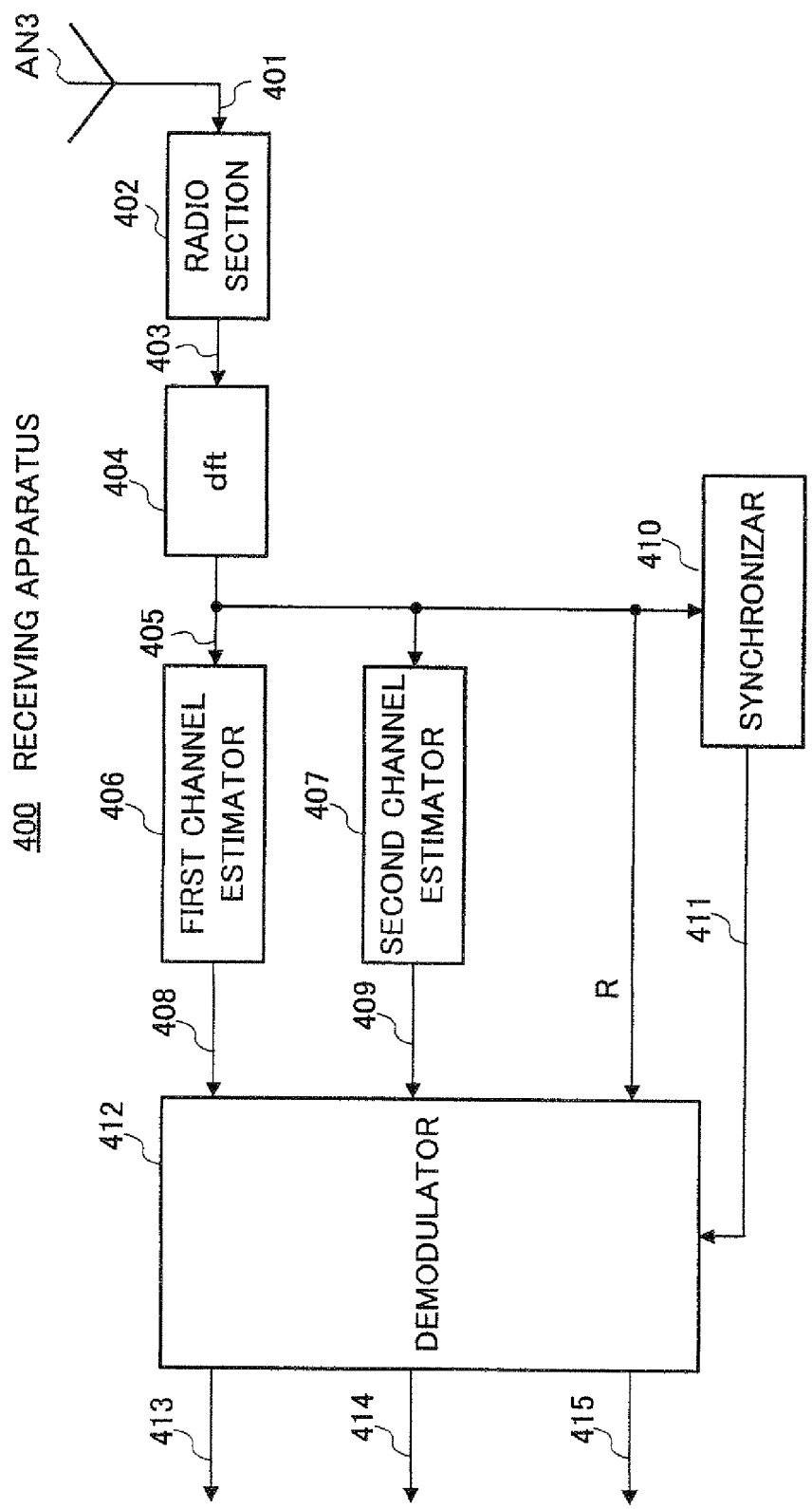
FIG. 18 is a block diagram showing a configuration of a receiving apparatus according to Embodiment 2.

FIG. 18 shows a configuration of a receiving apparatus that receives OFDM signals transmitted from transmitting apparatus 300. Receiving apparatus 400 inputs OFDM signal 401 received in antenna AN3 into radio section 402. Radio section 402 performs predetermined radio reception processing and sends baseband OFDM signal 403 obtained, to discrete Fourier transformer 404. Discrete Fourier transformer 404 performs the Fourier transform of baseband OFDM signal 403, and sends Fourier-transformed baseband signal 405 to first channel estimator 406, second channel estimator 407, synchronizer 410, and demodulator 412.

In accordance with the pilot symbols in the carriers in the OFDM signal transmitted at antenna AN1, first channel estimator 406 finds channel fluctuation between antenna AN1 and antenna AN3 per carrier, and sends the results to demodulator 412 in channel estimation signal 408. In accordance with the pilot symbols in the carriers in the OFDM signal transmitted at antenna AN2, second channel estimator 407 finds channel fluctuation between antenna AN2 and antenna AN3 per carrier, and sends the results to demodulator 412 in channel estimation signal 409.

In accordance with the pilot symbols in the signals transmitted at antennas AN1 and AN2, synchronizer 410 synchronizes the signals transmitted at antennas AN1 and AN2 and sends timing signal 411 for synchronization to demodulator 412.

Figure 19:
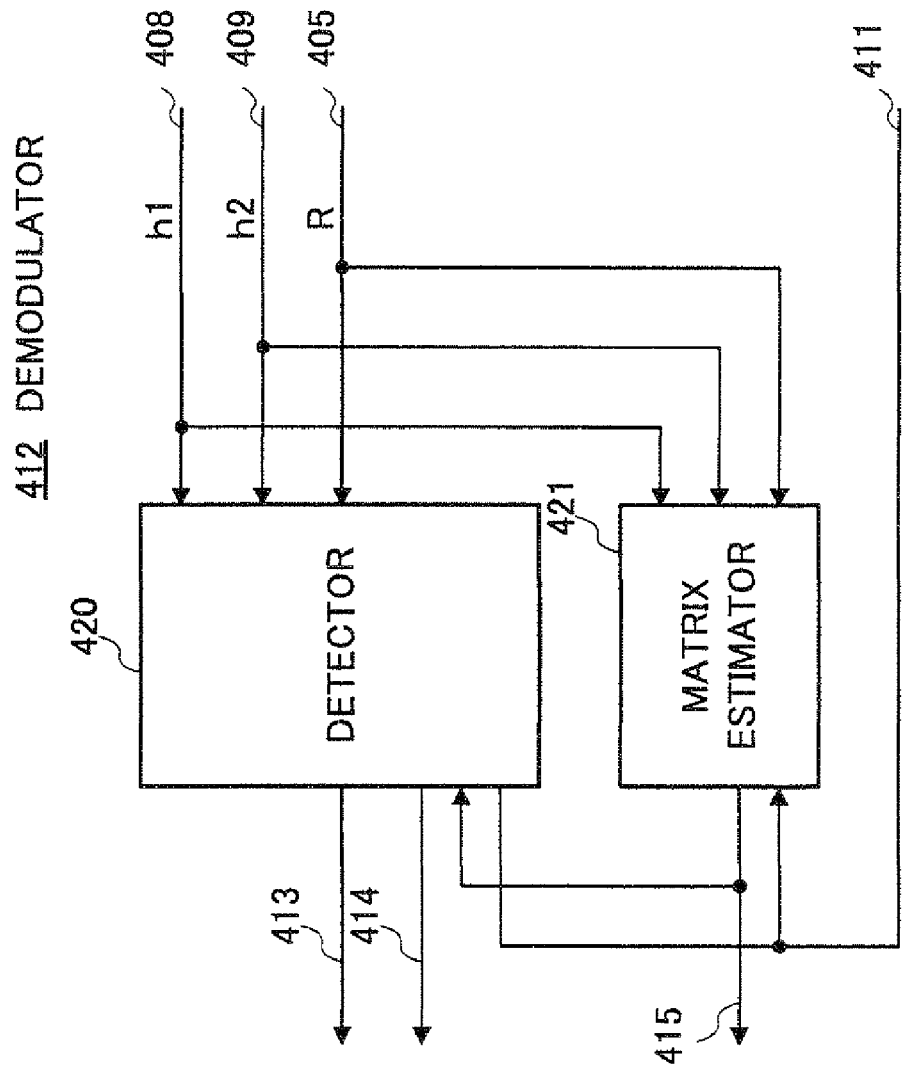
FIG. 19 is a block diagram showing a configuration of a demodulator.

FIG. 19 shows the configuration of demodulator 412. Demodulator 412 has detector 420 and matrix estimator 421, into which channel estimation signals 408 and 409, baseband signal 405, and timing signal 411 are inputted. Matrix estimator 421 estimates the matrix pattern of the estimated channel matrix and thereby estimates as to in which pattern the space-time block codes are received.

This will be explained in further details. A signal transmitted at antenna AN1 and a signal transmitted at antenna AN2 are combined and received in antenna AN3. This composite received signal at time t is R(t). In addition, channel estimation values h1 and h2 at time t are h1(t) and h2(t). Given these, the following relationship equation is established when space-time block codes are transmitted in the pattern shown in FIG. 16A:

[Equation 3]

$$\begin{pmatrix} R1(i) \\ R2(i) \end{pmatrix} = \begin{pmatrix} h1(i) & h2(i) \\ h2*(i) & -h1*(i) \end{pmatrix} \begin{pmatrix} S1 \\ S2 \end{pmatrix} \quad (3)$$

By contrast with this, the following relationship equation is established when space-time block codes are transmitted in the pattern shown in FIG. 16B:

[Equation 4]

$$\begin{pmatrix} R1(i) \\ R2(i) \end{pmatrix} = \begin{pmatrix} h2(i) & h1(i) \\ -h1*(i) & h2*(i) \end{pmatrix} \begin{pmatrix} S1 \\ S2 \end{pmatrix} \quad (4)$$

Upon receiving a signal in the frame configuration shown in FIG. 17, matrix estimator 421 estimates that carrier 1 and carrier 2 use the space-time block codes in the pattern of equation (3), outputs "0" as received data 415, and reports this to detector 420. In addition, matrix estimator 421 estimates that carrier 3 and carrier 4 use the space-time block codes in the pattern of equation (4), outputs "1" as received data 415, and reports this to detector 420.

Detector 420 uses equation (3) in respect to carrier 1 and carrier 2 and calculates the inverse matrix of equation (3), thereby estimating symbols S1 and S2, and thereafter demodulates symbols S1 and S2, thereby obtaining received data 413 corresponding to symbol S1 and received data 414 corresponding to symbol S2. Detector 420 uses equation (4) in respect to carrier 3 and carrier 4 and calculates the inverse matrix of equation (4), thereby estimating symbols S1 and S2 (in practice these symbols S1 and S2 are different from symbols S1 and S2 in carriers 1 and 2), and thereafter demodulates symbols S1 and S2, thereby obtaining received data 413 corresponding to symbol S1 and received data 414 corresponding to symbol S2.

In this way, receiving apparatus 400 is able to restore all of the transmission data including the data transmitted in the space-time block codes and the data transmitted by the pattern of the space-time block codes.

Thus, when transmitting OFDM signals by assigning space-time block codes to the subcarriers, the present embodiment changes the pattern of the space-time block codes according to transmission data. Consequently, the present embodiment has an advantage of transmitting data in excellent quality by virtue of the space-time block codes. Moreover, the present invention has an additional advantage of transmitting data by the pattern of the space-time block codes. The present embodiment thus makes possible improved data transmission rates.

In particular, assigning space-time block codes to the individual subcarriers of OFDM signals increase the number of space-time block codes that can be transmitted per unit time, so that the amount of transmission data per unit time also increases.

Figure 21:
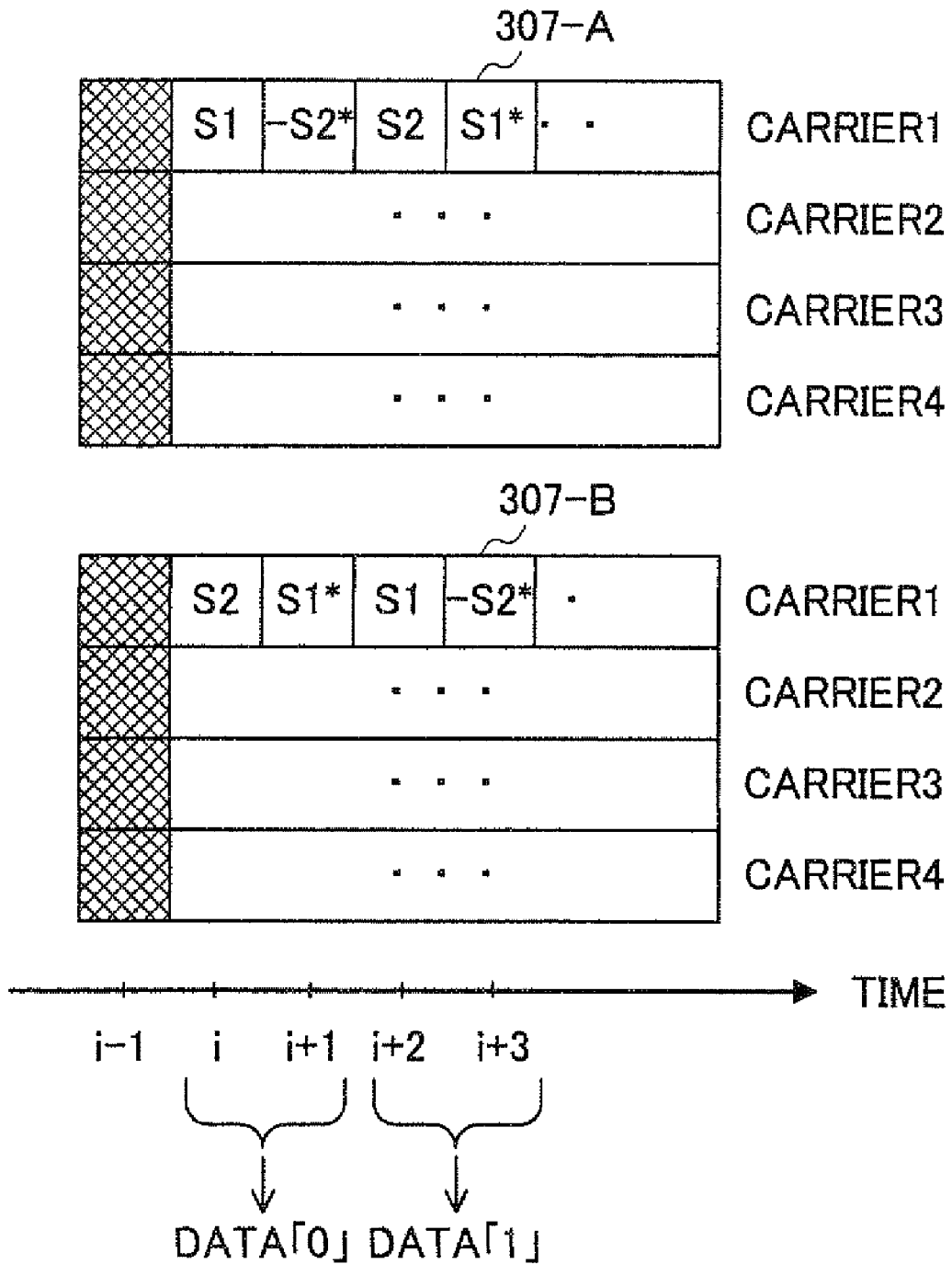
FIG. 21 illustrates an actual frame configuration when space-time block codes are arranged in the time domain.

Although a case has been described above with the present embodiment where space-time block codes are assigned to multiple carriers (that is, assigned in the frequency domain), the present invention is by no means limited to this, and, as shown in FIGS. 20A and 20B and FIG. 21, it is equally possible to assign space-time block codes to a single carrier (e.g. carrier 1 in FIGS. 20A and 20B, and FIG. 21) and assign the space-time code blocks in the time domain. In this case, it is certainly possible to assign other space-time block codes to other subcarriers 2, 3 and 4 as well.

This will be explained in further details. When transmission data represents "0," OFDM signals 307-A and 307-B, shown in FIG. 20A, are transmitted at antennas AN1 and AN2. On the other hand, when transmission data represents "1," OFDM signals 307-A and 307-B, shown in FIG. 20B, are transmitted at antennas AN1 and AN2.

FIG. 21 illustrates an actual frame configuration pattern. At time i–1, modulated signals of the pilot symbols are transmitted. Following this, at time i and time i+1, the space-time block codes are arranged in carrier 1 in a pattern associated with data "0" and transmitted, and, at subsequent times i+2 and i+3, the space-time block codes are arranged in carrier 1 in a pattern associated with data "1" and transmitted.

The arrangement of the space-time code blocks in the carriers can employ any method, including the method of arranging the space-time block codes in the frequency domain as shown in FIGS. 16A and 16B, and FIG. 17, the method of arranging the space-time block codes in the time domain as shown in FIGS. 20A and 20B and FIG. 21, and the method of arranging the space-time code blocks both in the frequency domain and in the time domain.

Although case has been described with the present embodiment where an OFDM scheme is employed, the present embodiment achieves the same advantages using other, non-OFDM multi-carrier schemes.

(Embodiment 3)

In this embodiment, the method of identifying the pattern of received space-time block codes at the receiving apparatus end will be described in detail.

For example, Embodiment 1 was designed to obtain one bit data by identifying at the receiving end as to whether a signal is transmitted in equation (1) or in equation (2). The identifying method will be described in detail in this embodiment.

In practice, in Embodiment 1, matrix estimator 221 of FIG. 11 identifies the pattern of space-time block codes. Accordingly, the process in estimator 221 will be described below in detail. A case will be described here in this embodiment where modulators 121 and 122 of transmitting apparatus 100 perform QPSK modulation.

From input of h1 (208) and h2 (209), channel estimator 221 finds sixteen candidate signal points at time i and sixteen candidate signal points at time i+1. FIGS. 22A and 22B each show an example. In FIGS. 22A and 22B, "○" represents a candidate signal point and "x" represents the receiving point. In addition, "●" represents a candidate signal point for the combination (00, 00) of two bits transmitted in symbol S1 and two bits transmitted in symbol S2. Likewise, any combination of two bits transmitted in transmission symbol S1 and two bits transmitted in symbol S2 is expressed in one of sixteen candidate signal points (00, 00) through (11, 11).

FIG. 22A illustrates signal points at time i and time i+1 where a signal employing the space-time block code pattern of equation (1) is received. FIG. 22B illustrates signal points at time i and time i+1 where a signal employing the space-time block code pattern of equation (2) is received.

Matrix estimator 221 identifies as to whether the signal was transmitted in the pattern in FIG. 22A or in the pattern in FIG. 22B, based on the Euclidian distance between the receiving point and each candidate signal points.

This will be explained in further details. Assuming the conditions where the signal was transmitted in equation (1) and the signal points are provided as shown in FIG. 22A, matrix estimator 221 first finds the square of the Euclidian distance between the signal receiving point and candidate signal points. For instance, if the square of the Euclidian distance between the candidate signal point for (00, 00) and the signal receiving point at time i is Dx0000(i), and if the square of the Euclidian distance between the candidate signal point for (00, 00) and the signal receiving point at time i+1 is Dx0000(i+1), the square of the Euclidian distance between (00, 00) and the receiving signal points is found as follows: Dx0000=Dx0000(i)+Dx0000(i+1). The same is found in respect to Dx0001 through Dx1111.

Likewise, assuming the conditions where the signal was transmitted in equation (2) and the signal points are provided as shown in FIG. 22B, matrix estimator 221 first finds the square of the Euclidian distance between the signal receiving point and candidate signal points. The signal receiving point has the same position as in the case of equation (1), yet the candidate signal points have different positions. For instance, if the square of the Euclidian distance between the candidate signal point for (00, 00) and the signal receiving point at time i is Dy0000(i), and if the square of the Euclidian distance between the candidate signal point for (00, 00) and the signal receiving point at time i+1 is Dy0000(i+1), the square of the Euclidian distance between (00, 00) and the receiving signal points is found as follows: Dy0000=Dy0000(i)+Dy0000(i+1). The same is found in respect to Dy0001 through Dy1111.

Matrix estimator 221 searches for minimum value Dx,min from Dx0000 through Dx1111 and likewise searches for minimum value Dy,min from Dy0000 through Dy1111. Next, channel estimator 221 compares Dx,min and Dy,min and determines the smaller one to be more reliable, and identifies the space-time block code pattern.

When Dx,min>Dy,min, Matrix estimator 221 determines that the signal was sent in the space-time block code pattern of equation (2) and obtains data representing "1" as received data 215. On the other hand, when Dy,min>Dx,min, channel estimator 221 determines that the signal was sent in the space-time block code pattern of equation (1) and obtains data representing "0" as received data 215.

In this way, channel estimator 221 is able to obtain receive data 215.

Although a case has been described with this embodiment where whether a signal is transmitted in the space-time block code pattern of equation (1) or in the space-time block code pattern of equation (2), is determined based solely on minimum values, the present invention is by no means limited to this, and it is equally possible to make that determination based on multiple Dx values and multiple Dy values.

In addition, although this embodiment has been described in conjunction with a method of identifying the pattern of space-time blocks in a signal transmitted from the transmitting apparatus of embodiment 1, the present invention is by no means limited to this, and variations are possible as long as reliability is compared between space-time block code patterns based on the Euclidian distance between the receiving point and candidate signal points. By this means, when multiple types of space-time block code patterns are in use, it is still possible to identify which space-time block code pattern is used.

(Other Embodiments)

Cases have been described above in Embodiment 1 and Embodiment 2 where two transmit antennas are provided and one receive antenna is provided. However, the present invention is by no means limited to this and is equally implementable when more than two antennas are provided and space-time block codes are used, for example, as introduced in "Space-time block codes from orthogonal designs," IEEE Transactions on Information Theory, pp. 1456-1467, Vol. 45, No. 5, July 1999, or in "A quasi-orthogonal space-time block code," IEEE Transactions on Communications, pp. 1-4, Vol. 49, No. 1, January 2001.

in addition, as obvious from equation (1) and equation (2), a case has been described above with Embodiment 1 where the antennas, to which symbols are supplied, are switched in accordance with transmission data and by this means the patterns of space-time block codes are formed by replacing the row components of matrix. However, as shown in FIGS. 23A and 23B, it is equally possible to employ space-time block code patterns that replace the column components of matrix and change the order in which symbols are outputted in accordance with transmission data. Moreover, the use of the pattern making method in Embodiment 1 and the pattern making method in FIGS. 23A and 23B in combination would make four possible patterns, so that two bit data can be transmitted in addition to the symbol information making space-time block codes.

In particular, if more than four antennas are provided, several space-time block coding schemes have already been proposed that achieve diversity gain, such as introduced in the above-mentioned references. The present invention may be designed to select one of these space-time block coding schemes in accordance with transmission data and perform data transmission. The receiving end identifies which coding scheme is used from the matrix pattern and obtains the data. In other words, space-time block code patterns are not limited to those described in Embodiment 1 and Embodiment 2, and various patterns are equally applicable as long as diversity gain is achieved at the receiving end.

Moreover, it is possible to make patterns by adaptively combining various pattern making methods utilizing different coding schemes, including the pattern making method explained in Embodiment 1 and the pattern making method illustrated in FIGS. 23A and 23B. In this way, it is possible to make a large number of space-time block code patterns, so that the amount of data that can be transmitted by space-time block code patterns further increases.

Furthermore, the present invention may be regarded as one that modulates channel estimation matrices in accordance with transmission data. By this means, it becomes possible to carry information on channel estimation matrices and increase the amount of transmission data. In other words, the present invention is broadly applicable to cases where the patterns in which symbol blocks are supplied to antennas are selected in accordance with transmission data. Embodiments 1 and 2 above utilize space-time block codes as symbol blocks.

Furthermore, a further application of the present invention is possible that fixes the signal points of symbols S1 and S2 and transmits data by means of only channel estimation matrices modulated by transmission data.

Although cases with space-time blocks have been described above with Embodiments 1 and 2, the transmitting apparatus of the present invention may be provided with a baseband signal former that changes the manner of assigning a modulated signal to a plurality of slots in accordance with transmission data and makes baseband signals in varying channel matrix patterns in accordance with transmission data. By this means, as explained above with Embodiments 1 and 2, data can be transmitted by channel matrix patterns, so that data transmission rate can be improved.

In addition, the receiving apparatus of the present invention may be provided with a channel matrix estimator that estimates a channel matrix using a plurality of slots of data, and a transmission data estimator that estimates transmission data based on a data assignment pattern to the channel matrix. By this means, transmission data can be estimated by the channel matrix pattern.

Now a simplified example of channel matrix pattern generation and differences from conventional M-ary spread spectrum communication scheme will be described. A case will be described here where there is one transmit antenna and one receive antenna.

Figure 24:
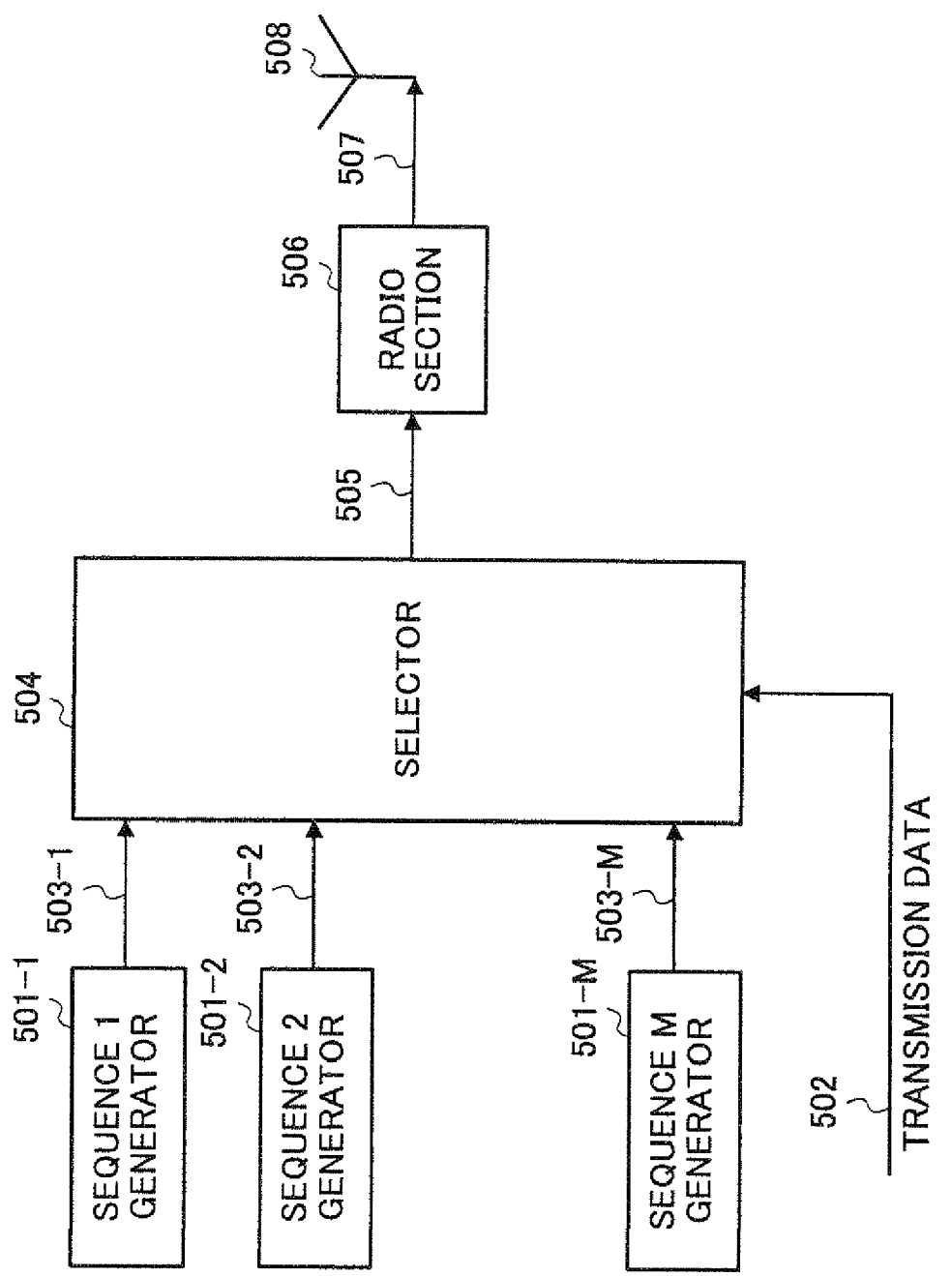
FIG. 24 is a block diagram showing a configuration of a transmitting apparatus using an M-ary spread spectrum communication scheme.

FIG. 24 shows the configuration of a transmitting apparatus using an M-ary spread spectrum communication scheme. The sequence generators (sequence 1 generator 501-1 to sequence M generator 501-M) generate spreading codes 503-1 to 503-M that are orthogonal with each other. Selector 504 receives orthogonal spreading codes 503-1 to 503-M, selects one of orthogonal spreading codes 503-1 to 503-M in accordance with transmission data 502, and outputs this to radio section 506 as baseband signal 505. Radio section 506 performs processing including quadrature modulation, band restriction, frequency conversion, signal amplification, etc., with baseband signal 505, obtains transmission signal 507, and transmits this to antenna 508.

Features of this M-ary spread spectrum communication scheme include the following two: spreading codes 503-1 to 503-M of sequence 1 to sequence M are orthogonal sequences (that have little cross-correlation); and, data transmission rate decreases by the proportion of spreading gain.

As an example, a frame configuration will be described for when M-ary spread spectrum communication scheme is used with two slots in the time domain. As shown in FIG. 25, when transmission data represents "0," at time i, (I, Q)=(1, 1) is transmitted, and, at time i+1, (I, Q)=(1, 1) is transmitted. On the other hand, when transmission data represents "1," at time i, (I, Q)=(1, −1) is transmitted, and, at time i+1, (I, Q)=(1, −1) is transmitted. Now, if the received signal at time i is R(i), the received signal at time i+1 is R(i+1) and the transmission coefficient is h(t), equation (5) is established when transmission data represents "0" and equation (6) is established when transmission data represents "1."

[Equation 5]
$$\begin{pmatrix} R(i) \\ R(i+1) \end{pmatrix} = \begin{pmatrix} h(i) & h(i) \\ h(i+1) & h(i+1) \end{pmatrix} \begin{pmatrix} 1 \\ 1 \end{pmatrix} \quad (5)$$

[Equation 6]
$$\begin{pmatrix} R(i) \\ R(i+1) \end{pmatrix} = \begin{pmatrix} h(i) & h(i) \\ -h(i+1) & -h(i+1) \end{pmatrix} \begin{pmatrix} 1 \\ 1 \end{pmatrix} \quad (6)$$

In the spread spectrum communication scheme, as shown in the equations above, representation in matrix is possible. However, the M-ary spread spectrum communication scheme and the present invention have the following differences. Features of the M-ary spread spectrum communication scheme include the following: a spreading sequence is the base and matrix is generated using orthogonal sequences (that have little cross-correlation); and that it is a technique for achieving spreading gain, not for improving data transmission rate (frequency usage efficiency), and does not present differences in transmission rate such as represented in the relationship between QPSK and 16QAM.

In contrast, with the method of the present invention for transmitting data using channel matrix patterns, data transmission rate (frequency usage efficiency) can be improved. FIG. 26 shows the frame configuration in the method of the present invention for transmitting data using channel matrix patterns. FIG. 26 presents two slots in the time domain. Although a case will be described here with reference to time domain slots, the case of forming a channel matrix with frequency domain slots is equally applicable.

When transmission data represents "00," at time i, (I, Q)=(1, 3) is transmitted, and at time i+1, (I, Q)=(3, 1) is transmitted. When transmission data represents "01," at time i, (I, Q)=(−1, 3) is transmitted, and at time i+1, (I, Q)=(3, −1) is transmitted. When transmission data represents "10," at time i, (I, Q)=(1, 3) is transmitted, and at time i+1, (I, Q)=(−3, 1) is transmitted. When transmission data represents "11," at time i, (I, Q)=(3, 1) is transmitted, and at time i+1, (I, Q)=(−3, 1) is transmitted.

Now, if the received signal at time i is R(i), the received signal at time i+1 is R(i+1) and the transmission coefficient is h(t), equation (7) is established when transmission data represents "00," equation (8) is established when transmission data represents "01," equation (9) is established when transmission data represents "10," and equation (10) is established when transmission data represents "11."

[Equation 7]

$$\begin{pmatrix} R(i) \\ R(i+1) \end{pmatrix} = \begin{pmatrix} h(i) & 3h(i) \\ 3h(i+1) & h(i+1) \end{pmatrix} \begin{pmatrix} 1 \\ 1 \end{pmatrix} \quad (7)$$

[Equation 8]

$$\begin{pmatrix} R(i) \\ R(i+1) \end{pmatrix} = \begin{pmatrix} -h(i) & 3h(i) \\ 3h(i+1) & -h(i+1) \end{pmatrix} \begin{pmatrix} 1 \\ 1 \end{pmatrix} \quad (8)$$

[Equation 9]

$$\begin{pmatrix} R(i) \\ R(i+1) \end{pmatrix} = \begin{pmatrix} h(i) & -h(i) \\ 3h(i+1) & 3h(i+1) \end{pmatrix} \begin{pmatrix} 1 \\ 1 \end{pmatrix} \quad (9)$$

[Equation 10]

$$\begin{pmatrix} R(i) \\ R(i+1) \end{pmatrix} = \begin{pmatrix} 3h(i) & -3h(i) \\ h(i+1) & h(i+1) \end{pmatrix} \begin{pmatrix} 1 \\ 1 \end{pmatrix} \quad (10)$$

Thus, in comparison, the present invention differs from the spread spectrum communication scheme in not using orthogonal sequences (that have little cross-correlation) and in not determining spreading gain. In addition, compared to the M-ary scheme, the present invention has distinct advantages of improving data transmission rate (frequency usage efficiency). In other words, the present invention is able to present differences in transmission rate such as represented by the relationship between QPSK and 16QAM.

Although a case has been described above for ease of explanation where there is one transmit antenna and one receive antenna, the present invention is by no means limited to this. For example, if there are two transmit antennas and two receive antennas, each of above equation (7) to equation (10) will be a 4×4 channel matrix. That is, at the transmitting end, by changing the manner of assigning a modulated signal to a plurality of slots in accordance with transmission data, a baseband signal that is equivalent to a 4×4 channel matrix is generated and transmission is done representing data by the channel matrix pattern. Then, at the receiving end, the 4×4 channel matrix is estimated using a plurality of slots of data and transmission data is estimated based on the data assignment pattern to the channel matrix. That is, the present invention is applicable to MIMO communication, and, when the present invention is applied to MIMO communication, channel matrix patterns can be increased, so that the amount of data transmitted by channel matrix patterns can be increased.

Incidentally, Embodiment 2 presents a case using space-time block codes, where diversity gain can be achieved and data transmission rate can be improved.

As described with the above-described embodiments, the present invention can be implemented in various ways.

One aspect of the transmitting apparatus of the present invention employs a configuration having: a baseband signal former that changes an assignment of a modulated signal to a plurality of slots in accordance with transmission data and makes baseband signals in varying channel matrix patterns in accordance with transmission data; a radio section that converts the baseband signals to radio signals; and a transmit antenna that transmits the radio signals.

According to this configuration, channel matrix patterns are changed in accordance with transmission data, so that, in addition to the modulated symbols constituting the elements of the channel matrix, the patterns of the channel matrix can be used to transmit data. As a result, the amount of transmission data can be increased without widening the frequency band and frequency usage efficiency can be improved.

Another aspect of the transmitting apparatus of the present invention employs a configuration where a transmit antenna is comprised of a plurality of antennas and a baseband signal former makes baseband signals in varying channel matrix patterns in for the plurality of antennas.

According to this configuration, data can be transmitted using channel matrix patterns for a plurality of antennas, so that the amount of transmission data can be further increased. Furthermore, according to this configuration, the amount of transmission data in MIMO communication can be increased.

Another aspect of the transmitting apparatus of the present invention employs a configuration where a transmit antenna is comprised of a plurality of antennas and a baseband signal former has a space-time block encoder that changes a pattern of a space-time block code in accordance with transmission data.

According to this configuration, data transmission can be performed in good quality by virtue of space-time block codes, and, in addition, data can be transmitted by the patterns of in space-time block codes, so that the amount of transmission data can be increased.

Another aspect of the transmitting apparatus of the present invention employs a configuration where the space-time block encoder has: a first modulator that makes a first transmission symbol from transmission data; a second modulator that makes a second transmission symbol from the transmission data; and a signal selector that receives the first and second transmission symbols, outputs to the plurality of antennas the first and second transmission symbols and signals representing complex conjugates of said first and second symbols, by changing an order of said first and second symbols and the complex conjugate signals in accordance with transmission data, and makes a space-time block code signal.

According to this configuration, with the signal selector, space-time block code signals are obtained in varying patterns in accordance with transmission data, so that, in addition to data transmitted by space-time block codes formed with the first and second modulated symbols, data can be transmitted by the patterns of space-time block code signals.

Another aspect of the transmitting apparatus of the present invention employs a configuration having a multi-carrier modulator that assigns a signal made in the space-time block encoder to a plurality of subcarriers, where the space-time block code signal is subjected to multi-carrier modulation and transmitted at the plurality of antennas.

According to this configuration, the amount of transmission data can be increased when, for example, space-time block codes are transmitted by the OFDM scheme.

One aspect of the receiving apparatus of the present invention employs a configuration having a channel matrix estimator that estimates a channel matrix using a plurality of slots of data; and a transmission data estimator that estimates transmission data based on a data assignment pattern to the channel matrix.

Another aspect of the receiving apparatus of the present invention employs a configuration where a transmission data estimator identifies a pattern of space-time block codes received and estimates transmission data.

Another aspect of the receiving apparatus of the present invention employs a configuration where a transmission data estimator identifies a pattern of an estimated channel matrix employed between a transmit antenna and a receive antenna and identifies the pattern of the space-time block codes.

According to these configurations, in addition to data transmitted by space-time block cods, data that is transmitted by the patterns of space-time block codes can be restored.

One aspect of the wireless communication method of the present invention has the steps of changing an assignment of a modulated signal to a plurality of slots in accordance with transmission data and making baseband signals in varying channel matrix patterns in accordance with transmission data, and transmitting the baseband signals; and estimating a channel matrix using a plurality of sots of data and estimating transmission data based on a data assignment pattern to the channel matrix.

The present invention is not limited to the above described embodiments, and various variations and modifications may be possible without departing from the scope of the present invention.

This application is based on Japanese Patent Application No. 2004-37088 filed on Feb. 13, 2004, and Japanese Patent Application No. 2004-361105 filed on Dec. 14, 2004, entire content of which is expressly incorporated by reference herein.

Industrial Applicability

The present invention is applicable to base stations in a wireless LAN (Local Area Network) and terminals thereof, and base station in a mobile communication system and terminals thereof.

The invention claimed is:

1. A transmitting apparatus comprising:
a baseband signal former that forms baseband signals in varying channel matrix patterns according to transmission data by changing a manner of assigning a modulated signal to a plurality of slots according to the transmission data;
a radio section that converts the baseband signals to radio signals; and
a transmit antenna that transmits the radio signals, wherein:
the transmit antenna comprises a plurality of antennas; and
the baseband signal former comprises a space-time block code signal former that changes a pattern of a space-time block code according to the transmission data,
wherein the baseband signal former assigns the modulated signal by assigning the same transmission data to the plurality of slots.

2. The transmitting apparatus according to claim 1, wherein the space-time block code signal former comprises:
a first modulator that forms a first transmission symbol from the transmission data;
a second modulator that forms a second transmission symbol from the transmission data; and
a signal selector that forms a space-time block code signal by receiving as input the first and second transmission symbols, changing an output order of the first and second symbols and complex conjugate signals according to the transmission data and outputting the first and second transmission symbols and the complex conjugate signals, to first and second antennas of the plurality of antennas.

3. The transmitting apparatus according to claim 1, further comprising a multi-carrier modulator that assigns a space-time block code signal formed in the space-time block code signal former to a plurality of subcarriers,
wherein the space-time block code signal subjected to multi-carrier modulation is transmitted from the plurality of antennas.

4. A receiving apparatus comprising:
a channel matrix estimator that estimates a channel matrix using a plurality of slots of data; and
a transmission data estimator that estimates transmission data based on a data assignment pattern of the channel matrix,
wherein the transmission data estimator estimates the transmission data by identifying a pattern of received space-time block codes, and
wherein the transmission data is formed by assigning the same transmission data to the plurality of slots.

5. The receiving apparatus according to claim 4, wherein the transmission data estimator identifies the pattern of the received space-time block codes by identifying a pattern of a channel matrix employed between a transmit antenna and a receive antenna.

6. A wireless communication method comprising:
a transmission step of forming baseband signals in varying channel matrix patterns according to transmission data by changing a manner of assigning a modulated signal to a plurality of slots according to the transmission data, and transmitting the baseband signals using a plurality of antennas; and
a receiving step of estimating a channel matrix using the plurality of slots and estimating the transmission data based on a data assignment pattern of the channel matrix,
wherein the assigning of the modulated signal to the plurality of slots comprises assigning the same transmission data to the plurality of slots.

* * * * *

UNITED STATES PATENT AND TRADEMARK OFFICE
CERTIFICATE OF CORRECTION

PATENT NO. : 8,223,878 B2
APPLICATION NO. : 12/689923
DATED : July 17, 2012
INVENTOR(S) : Yutaka Murakami et al.

It is certified that error appears in the above-identified patent and that said Letters Patent is hereby corrected as shown below:

Title Page

Item (56), Foreign Patent Documents, page 2, column 1:

"0207132"

should read:

"02/07132".

Signed and Sealed this
Fifteenth Day of October, 2013

Teresa Stanek Rea
*Deputy Director of the United States Patent and Trademark Office*